(12) United States Patent
Miyake et al.

(10) Patent No.: US 11,993,526 B2
(45) Date of Patent: May 28, 2024

(54) WATER TREATMENT METHOD AND WATER TREATMENT DEVICE

(71) Applicant: ORGANO CORPORATION, Tokyo (JP)

(72) Inventors: Masaki Miyake, Tokyo (JP); Yoshiaki Hasebe, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 100 days.

(21) Appl. No.: 16/965,215

(22) PCT Filed: Feb. 7, 2019

(86) PCT No.: PCT/JP2019/004356
§ 371 (c)(1),
(2) Date: Jul. 27, 2020

(87) PCT Pub. No.: WO2019/156144
PCT Pub. Date: Aug. 15, 2019

(65) Prior Publication Data
US 2021/0061691 A1 Mar. 4, 2021

(30) Foreign Application Priority Data
Feb. 9, 2018 (JP) ................................. 2018-022077

(51) Int. Cl.
*C02F 3/30* (2023.01)
*C02F 3/00* (2023.01)
(Continued)

(52) U.S. Cl.
CPC .............. *C02F 3/302* (2013.01); *C02F 3/006* (2013.01); *C02F 3/12* (2013.01); *C02F 2101/16* (2013.01)

(58) Field of Classification Search
CPC .. C02F 3/302; C02F 3/006; C02F 3/12; C02F 3/1263; C02F 3/301; C02F 2101/16; C02F 1/008; C02F 2203/004; Y02W 10/10
(Continued)

(56) References Cited

U.S. PATENT DOCUMENTS

2014/0374345 A1 12/2014 Furuya et al.
2014/0374346 A1 12/2014 Furuya et al.

FOREIGN PATENT DOCUMENTS

CN 101830560 A * 9/2010
CN 105217882 A 1/2016
(Continued)

OTHER PUBLICATIONS

Wang et al., CN 101830560, English machine translation, pp. 1-4 (Year: 2010).*
(Continued)

*Primary Examiner* — Claire A Norris
(74) *Attorney, Agent, or Firm* — GREENBLUM & BERNSTEIN, P.L.C.

(57) ABSTRACT

The water treatment method is for treating water to be treated that contains organic matter and a nitrogen component, and includes, in a biological treatment device including at least an aerobic tank: a biological treating for biologically treating inflowing water to be treated aerobically by using sludge that contains granules; a solid-liquid separating for separating the biological treatment solution in the aerobic tank into treated water and concentrated sludge using a solid-liquid separation device; and a sludge returning for returning the concentrated sludge obtained in the solid-liquid separating to a stage before the biological treatment device. The concentration of ammonium nitrogen remaining due to the nitrification reaction in the aerobic tank is
(Continued)

measured with an ammonium nitrogen concentration measurement device, and the amount of gas containing oxygen dispersed to the aerobic tank is controlled with a blower so that the measured ammonium nitrogen concentration is within a prescribed range.

17 Claims, 13 Drawing Sheets

(51) Int. Cl.
*C02F 3/12* (2023.01)
*C02F 101/16* (2006.01)

(58) Field of Classification Search
USPC ........ 210/605, 620, 623, 630, 739, 903, 908
See application file for complete search history.

(56) References Cited

FOREIGN PATENT DOCUMENTS

| | | |
|---|---|---|
| CN | 105731630 A | 7/2016 |
| CN | 106795021 A | 5/2017 |
| JP | 2001-347291 | 12/2001 |
| JP | 2008-284427 A | 11/2008 |
| JP | 2012-200705 A | 10/2012 |
| JP | 2013-81881 A | 5/2013 |
| JP | 2014-133202 A | 7/2014 |
| JP | 5878231 B2 | 3/2016 |
| JP | 6022536 B2 | 11/2016 |
| JP | 2016193389 A * | 11/2016 |
| WO | 2016/056367 A1 | 4/2016 |

OTHER PUBLICATIONS

International Search Report issued in International Patent Application No. PCT/JP2019/004356, dated Mar. 26, 2019, and English Translation thereof.
Office Action issued in corresponding Chinese App. No. 201980009905.6, dated Jan. 30, 2022, along with English translation.
Office Action issued in corresponding Japanese Patent App. No. 2018-022077, dated Dec. 7, 2021, along with English translation.
Office Action issued in corresponding Chinese Patent Application No. 201980009905.6, issued on Apr. 21, 2022, along with English translation.
Office Action issued in corresponding Japanese Patent App. No. 2018-022077, dated May 24, 2022, along with its English translation.
Office Action issued in Chinese Patent Application No. 201980009905.6 dated Sep. 16, 2022, along with excerpt English translation thereof.

* cited by examiner

WATER TREATMENT METHOD AND WATER TREATMENT DEVICE

CROSS REFERENCE TO RELATED APPLICATION

This application claims priority to Japanese Patent Application No. 2018-022077 filed on Feb. 9, 2018, which is incorporated herein by reference in its entirety including the specification, claims, drawings, and abstract.

TECHNICAL FIELD

The present disclosure relates to a water treatment method and a water treatment device for treating a water to be treated containing organic matter and a nitrogen component.

BACKGROUND

The biological water treatment of wastewater such as sewage typically uses an activated sludge method that utilizes an aggregate of microbes (aerobic biological sludge) known as a floc. The activated sludge method is an aerobic microbial treatment method in which, by supplying oxygen into an activated sludge inside a bioreactor while a wastewater is introduced into the bioreactor, organic matter within the wastewater is decomposed by metabolism by various aerobic microbes within the activated sludge, yielding a clear treated water, and is a treatment method that is widely used, particularly for the treatment of sewage.

One issue for the activated sludge method using an aerobic microbial treatment method is to reduce the energy consumption by the blower required for supplying the oxygen (aeration). Examples of methods for dealing with this issue include controlling the amount of aeration in accordance with the amount of inflow of the wastewater, and controlling the amount of aeration in accordance with the level of dissolved oxygen (DO).

In particular, in those cases where an organic wastewater containing a nitrogen component is also subjected to a nitrogen treatment, a nitrification reaction under aerobic conditions and a denitrification reaction under anaerobic conditions are typically performed, but in the case where the amount of aeration is controlled in accordance with the amount of inflow of the wastewater, tracking fluctuations in the concentration of the introduced wastewater is difficult. Further, in the case where the amount of aeration is controlled in accordance with the level of dissolved oxygen (DO), because an amount of oxygen exceeding that necessary for a complete nitrification reaction is supplied, increasing the nitrogen removal rate in the denitrification reaction under aerobic conditions is difficult.

In light of the circumstances described above, methods are being investigated in which operation of the blower in the aerobic tank inside the bioreactor is controlled, and the denitrification treatment and nitrification treatment inside the bioreactor are also controlled, thereby increasing the nitrogen removal rate and improving the treated water (see Patent Document 1 and Patent Document 2).

Further, in those cases where the wastewater contained phosphorus, and a treatment is performed with the aim of biologically treating the phosphorus in the wastewater, the phosphorus is typically treated using an anaerobic activated sludge method (AO method). The AO method is a treatment method that utilizes metabolism by polyphosphate-accumulating organisms within the activated sludge, and is a method in which, first, hydrolysis from polyphosphoric acid to phosphoric acid and the production of polyhydroxyalkanoic acids (PHA) occur inside the cells of the organisms under anaerobic conditions, and excess phosphoric acid inside the cells is then discharged from the cells. Then, under aerobic conditions, synthesis of adenosine triphosphate and bacterial cells from the organic matter and the accumulated PHA occurs, while an amount of phosphoric acid exceeding that discharged under anaerobic conditions is absorbed as polyphosphoric acid. However, the stability of that treatment is heavily affected by concentration fluctuations in the quality of the inflow water. For example, the effect of the weather (rain) in the sewage treatment process for combined sewage causes a deterioration in the quality of the inflow water, resulting in a deterioration in the production of PHA in the anaerobic tank and in the phosphoric acid discharge activity. This then causes a deterioration in the absorption activity in the aerobic tank. Recovery in the activity of the polyphosphate-accumulating organisms within the activated sludge is sometimes unable to conform with the increase in the phosphorus concentration in the inflow sewage, resulting in a worsening of the phosphorus removal rate.

The methods disclosed in Patent Document 1 and Patent Document 2 are treatment methods that target sewage treatment, but unless a deep reaction tank with a water depth of at least 10 m is used, almost no effects are observed. Further, in a deep reaction tank, it is necessary to provide partition walls inside the reaction tank and perform aeration using an aeration device installed in a location about 4 to 5 m from the bottom of the reaction tank, generating a swirling flow inside the tank. Introducing this type of deep reaction tank requires significant reconstruction work on the reaction tank body, meaning in a large-scale treatment facility such as a sewage plant, the increase in introduction costs can be problematic. Furthermore, in order to improve the effects, it is necessary to increase the sludge concentration to increase the MLSS (for example, to an MLSS of at least 2,000 mg/kg), but from the viewpoint of solid-liquid separation of the sludge, increasing the sludge concentration is difficult.

CITATION LIST

Patent Literature

Patent Document 1: JP 5878231 B
Patent Document 2: JP 6022536 B

SUMMARY

An object of the present disclosure is to provide a water treatment method and a water treatment device which, in the treatment of a water to be treated containing organic matter and a nitrogen component, can be introduced in a standard tank with an effective water depth of 5 m or less, and can suppress energy consumption for aeration and improve the nitrogen removal rate from the water to be treated while maintaining a high MLSS value.

The present disclosure provides a water treatment method for treating a water to be treated containing organic matter and a nitrogen component, the method including a biological treatment step of conducting, in a biological treatment device having at least an aerobic tank, an aerobic biological treatment of the inflow water to be treated using a sludge containing granules, a solid-liquid separation step of performing a solid-liquid separation of the sludge mixed liquid inside the aerobic tank into a treated water and a concentrated sludge, and a sludge return step of returning the concentrated sludge obtained in the solid-liquid separation step to upstream of the biological treatment device, wherein the ammonium nitrogen concentration remaining as a result of the nitrification reaction in the aerobic tank is measured, and the aeration amount of the oxygen-containing gas introduced into the aerobic tank is controlled so that the measured ammonium nitrogen concentration falls within a prescribed range.

In the water treatment method described above, the ammonium nitrogen concentration may be measured in an end portion of the aerobic tank, and the aeration amount of the oxygen-containing gas introduced into the aerobic tank may be then controlled so that the ammonium nitrogen concentration in the outflow portion of the aerobic tank falls within a range from at least 0.5 mgN/L to not more than 5 mgN/L.

In the water treatment method described above, the particle size of the granules may be at least 200 μm, and that the sludge concentration in the aerobic tank may be at least 2,000 mg/L.

In the water treatment method described above, the granules may be formed in a granule formation tank installed outside the biological treatment device, and then supplied from the granule formation tank to the biological treatment device.

In the water treatment method described above, the granules may be formed in a granule formation tank that is provided by partitioning off a portion of the aerobic tank, and may be then supplied from the granule formation tank to the biological treatment device.

In the water treatment method described above, the granule formation tank may be a sequencing batch reaction tank.

In the water treatment method described above, an ammonia measurement device installed at least in an end portion of the aerobic tank may be used as an ammonium nitrogen concentration measurement unit for measuring the ammonium nitrogen concentration in the end portion of the aerobic tank.

In the water treatment method described above, at least one water quality measurement unit selected from among an ammonium nitrogen concentration measurement unit, a dissolved oxygen measurement unit and a nitrate concentration measurement unit may be installed in a location along the lengthwise direction different from the installation location of the ammonia measurement device mentioned above, and the aeration amount of the oxygen-containing gas introduced into the aerobic tank may be then controlled so that the measured value from each water quality measurement unit falls within a prescribed range.

In the water treatment method described above, the effective water depth of the biological treatment device containing the aerobic tank may be 5 m or less.

Furthermore, the present disclosure also provides a water treatment device for treating a water to be treated containing organic matter and a nitrogen component, the water treatment device containing: a biological treatment device that contains at least an aerobic tank and an oxygen-containing gas supply unit for supplying an oxygen-containing gas to the aerobic tank, and conducts an aerobic biological treatment of an inflow water to be treated using a sludge containing granules; a solid-liquid separation unit that performs a solid-liquid separation of a sludge mixed liquid inside the aerobic tank into a treated water and a concentrated sludge; a sludge return unit that returns the concentrated sludge obtained in the solid-liquid separation unit to upstream of the biological treatment device; an ammonium nitrogen concentration measurement unit that measures the ammonium nitrogen concentration remaining as a result of the nitrification reaction in the aerobic tank; and a control unit that controls the aeration amount of the oxygen-containing gas introduced into the aerobic tank so that the ammonium nitrogen concentration measured by the ammonium nitrogen concentration measurement unit falls within a prescribed range.

In the water treatment device described above, the control unit may control the aeration amount of the oxygen-containing gas introduced into the aerobic tank so that the ammonium nitrogen concentration in the outflow portion of the aerobic tank, measured using the ammonium nitrogen concentration measurement unit, falls within a range from at least 0.5 mgN/L to not more than 5 mgN/L.

In the water treatment device described above, the particle size of the granules may be at least 200 μm, and that the sludge concentration in the aerobic tank may be at least 2,000 mg/L.

In the water treatment device described above, the granules may be formed in a granule formation tank installed outside the biological treatment device, and then supplied from the granule formation tank to the biological treatment device.

In the water treatment device described above, the granules may be formed in a granule formation tank that is provided by partitioning off a portion of the aerobic tank, and may be then supplied from the granule formation tank to the biological treatment device.

In the water treatment device described above, the granule formation tank may be a sequencing batch reaction tank.

In the water treatment device described above, the ammonium nitrogen concentration measurement unit may be installed in an end portion of the aerobic tank.

In the water treatment device described above, at least one water quality measurement unit selected from among an ammonium nitrogen concentration measurement unit, a dissolved oxygen measurement unit and a nitrate concentration measurement unit may be installed in a location along the lengthwise direction different from the installation location of the ammonium nitrogen concentration measurement unit, and the aeration amount of the oxygen-containing gas introduced into the aerobic tank may be then controlled so that the measured value from each water quality measurement unit falls within a prescribed range.

In the water treatment device described above, the effective water depth of the biological treatment device containing the aerobic tank may be 5 m or less.

The present disclosure provides a water treatment method and a water treatment device which, in the treatment of a water to be treated containing organic matter and a nitrogen component, can be introduced in a standard tank with an effective water depth of 5 m or less, and can suppress energy consumption for aeration and improve the nitrogen removal rate from the water to be treated while maintaining a high MLSS value.

DESCRIPTION OF EMBODIMENTS

Embodiments of the present disclosure are described below. These embodiments are merely examples of implementing the present disclosure, and the present disclosure is in no way limited by these embodiments.

Figure 1:
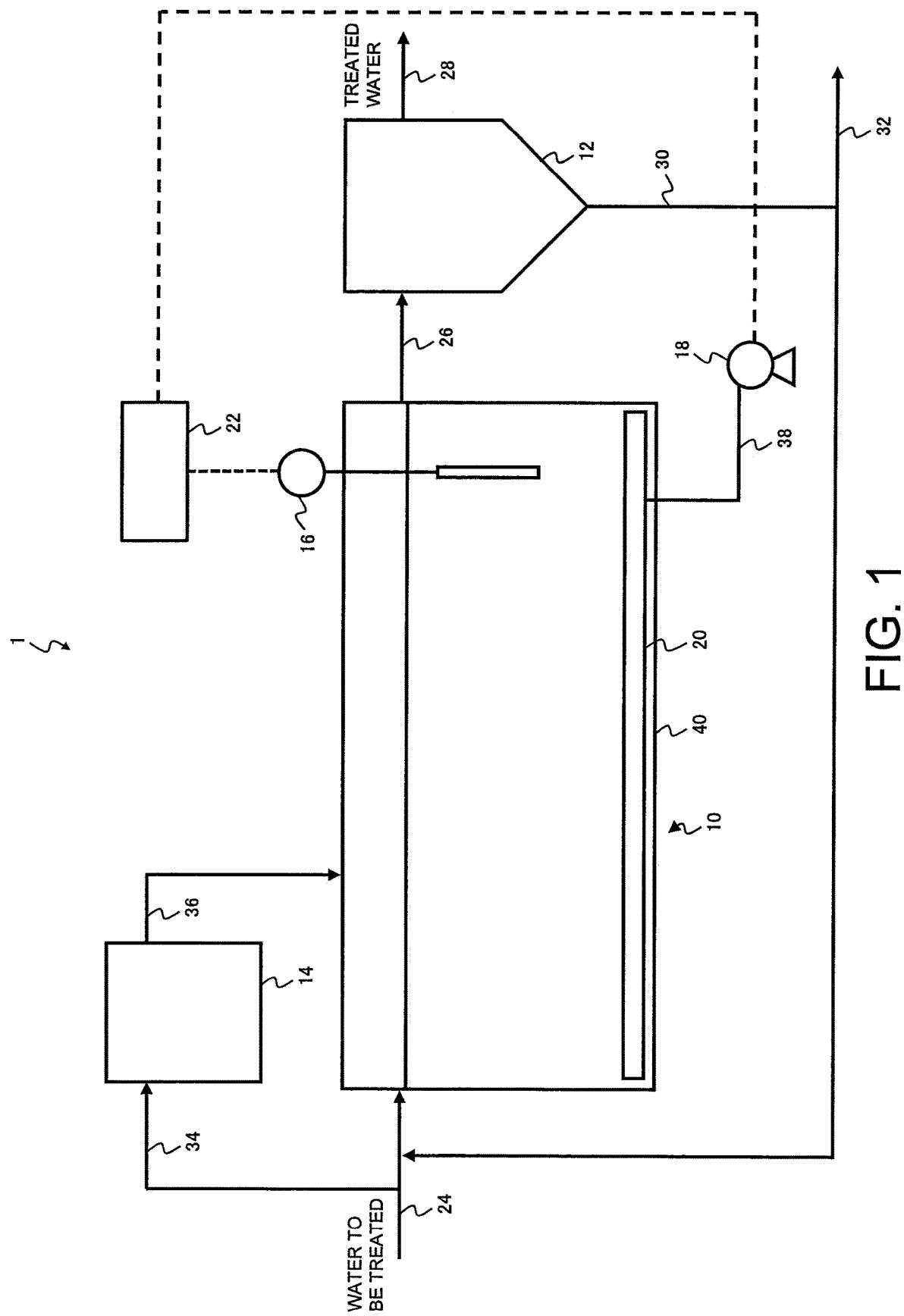
FIG. 1 is a schematic structural diagram illustrating one example of a water treatment device according to an embodiment of the present disclosure.

A schematic illustration of one example of a water treatment device according to an embodiment of the present disclosure is shown in FIG. 1, and the structure of that apparatus is described below.

Embodiment 1

The water treatment device 1 is a water treatment device for treating a water to be treated containing organic matter and a nitrogen component, and contains: a biological treatment device 10 that contains at least an aerobic tank 40 and a blower that functions as an oxygen-containing gas supply unit for supplying an oxygen-containing gas to the aerobic tank 40, and conducts an aerobic biological treatment of an inflow water to be treated using a sludge containing granules; a solid-liquid separation device 12 which functions as a solid-liquid separation unit that performs a solid-liquid separation of the biologically treated liquid inside the aerobic tank 40 into a treated water and a concentrated sludge; a sludge return line 30 which functions as a sludge return unit that returns the concentrated sludge obtained in the solid-liquid separation device 12 to upstream of the biological treatment device 10; an ammonium nitrogen concentration measurement device 16 which functions as an ammonium nitrogen concentration measurement unit that measures the ammonium nitrogen concentration remaining as a result of the nitrification reaction in the aerobic tank 40; and a control device 22 which functions as a control unit that controls the aeration amount of the oxygen-containing gas introduced into the aerobic tank 40 by a blower 18 so that the ammonium nitrogen concentration measured by the ammonium nitrogen concentration measurement device 16 falls within a prescribed range. The water treatment device 1 may also contain a granule formation tank 14 installed outside the biological treatment device 10. The solid-liquid separation device 12 is a separation device for separating the biological sludge and the treated water from the water containing the biological sludge, and although there are no particular limitations on this device, examples include separation devices that employ settling, pressure flotation, filtration, or membrane separation or the like.

In the water treatment device 1 of FIG. 1, a water to be treated line 24 is connected to a water to be treated inlet of the aerobic tank 40 of the biological treatment device 10. The outlet of the aerobic tank 40 and the inlet of the solid-liquid separation device 12 are connected by a biologically treated liquid line 26. A treated water line 28 is connected to the treated water outlet of the solid-liquid separation device 12. A sludge outlet in the lower portion of the solid-liquid separation device 12 and a location partway along the water to be treated line 24 are connected by a sludge return line 30. A sludge discharge line 32 is connected partway along the sludge return line 30. A location on the water to be treated line 24 on the upstream side of the connection point for the sludge return line 30 and the inlet of the granule formation tank 14 are connected by a water to be treated line 34. The outlet of the granule formation tank 14 and the granule inlet of the biological treatment device 10 are connected by a granule line 36. An aeration device 20 is installed in the bottom of the aerobic tank 40 of the biological treatment device 10, and the gas supply side of the blower 18 is connected to the aeration device 20 by a gas supply line 38. The ammonium nitrogen concentration measurement device 16 is installed, for example, in an end portion of the aerobic tank 40 of the biological treatment device 10. The ammonium nitrogen concentration measurement device 16 and the blower 18 are connected to the control device 22 by an electrical connection or the like.

Next is a description of the operation of the water treatment method and the water treatment device 1 according to this embodiment.

The water to be treated containing organic matter and a nitrogen component passes through the water to be treated line 24, and is supplied to the aerobic tank 40 of the biological treatment device 10. The aerobic tank 40 is a continuous reaction tank in which aeration is performed by supplying an oxygen-containing gas such as air from the blower 18 through the aeration device 20, the inside of the tank is stirred, and an aerobic state can be maintained. On the other hand, a portion of the water to be treated passes through the water to be treated line 34 and is supplied to the granule formation tank 14, granules are formed in the granule formation tank 14 (the granule formation step), and the formed granules are supplied to the aerobic tank 40 through the granule line 36. In the water treatment device 1, granules may also be formed inside the aerobic tank 40 of the biological treatment device 10, without providing a separate granule formation tank 14.

In the aerobic tank 40, the continuous inflow of the water to be treated and the sludge containing the granules are mixed, decomposition of the organic matter by organic matter-oxidizing bacteria and conversion of ammonium nitrogen to nitrite nitrogen ($NO_2$) or nitrate nitrogen ($NO_3$) by nitrifying bacteria (a nitrification reaction) occur under aerobic conditions, and moreover, as described below, within the interior of the granules, the conversion of nitrite nitrogen (NO$_2$) or nitrate nitrogen (NO$_3$) to nitrogen (N$_2$) (a denitrification reaction) occurs under anaerobic conditions (the biological treatment step).

In, for example, an end portion of the aerobic tank 40, the remaining ammonium nitrogen concentration is measured by the ammonium nitrogen concentration measurement device 16 to gauge the degree of progression of the nitrification reaction (the ammonium nitrogen concentration measurement step), and the amount of aeration of the oxygen-containing gas into the aerobic tank 40 is controlled so that the ammonium nitrogen concentration at the outflow portion of the aerobic tank 40, namely at the portion prior to the solid-liquid separation device 12, falls within a prescribed range (the control step). For example, based on the difference between the value of the ammonium nitrogen concentration measured by the ammonium nitrogen concentration measurement device 16 and the value of an ammonium nitrogen concentration that has been previously input into the control device 22, the output from the blower 18 is determined by the control device 22, and the amount of aeration of the oxygen-containing gas into the aerobic tank 40 by the blower 18 is controlled so that the ammonium nitrogen concentration at the outflow portion of the aerobic tank 40 falls within a prescribed range, for example, the amount of aeration required for complete nitrification or a lesser amount of aeration. By controlling the ammonium nitrogen concentration at the outflow portion of the aerobic tank 40 so that the concentration falls within a prescribed range, the amount of aeration is controlled to the amount required for complete nitrification or a lesser amount, and therefore the amount of dissolved oxygen (DO) in the aerobic tank 40 can be maintained at a low level. As a result, a nitrification reaction occurs on the surfaces of the granules that exist inside the aerobic tank 40, whereas the interior of the granules adopt anoxic conditions (in which no molecular oxygen exists), and a denitrification reaction proceeds utilizing the organic matter produced by hydrolysis of residual soluble organic matter within the reaction liquid and solid components (SS: suspended solids) within the water to be treated, thereby removing nitrite nitrogen and nitrate nitrogen from within the aerobic tank 40. Furthermore, the supplied oxygen is consumed by the respiration action of the activated sludge, and therefore increasing the sludge concentration increases the oxygen consumption rate. By controlling the amount of oxygen supplied to the prescribed amount required for nitrification based on the ammonium nitrogen concentration measured by the ammonium nitrogen concentration measurement device 16, the amount of dissolved oxygen in the aerobic tank 40 can be suppressed to a lower level than that observed under conditions of low sludge concentration, and therefore forming anoxic conditions becomes easier, enabling the denitrification reactions to proceed even in widely used standard tanks in which the effective water depth of the aerobic tank 40 is 5 m or less. Furthermore, by controlling the amount of aeration of the oxygen-containing gas into the aerobic tank 40 by the blower 18 so that the ammonium nitrogen concentration at the outflow portion falls within a prescribed range, aerobic oxidation reactions and nitrification reactions of organic matter (BOD) in the aerobic tank 40 can be moderated, and therefore the denitrification reactions within the interior of the granules may proceed more readily.

The biologically treated liquid that has undergone treatment in the aerobic tank 40 is fed through the biologically treated liquid line 26 and into the solid-liquid separation device 12. A solid-liquid separation is conducted in the solid-liquid separation device 12, and the liquid is separated into a clear treated water and a concentrated sludge (the solid-liquid separation step). The treated water is discharged through the treated water line 28. At least a portion of the concentrated sludge is passed through the sludge return line 30 and the water to be treated line 24, and returned continuously into the aerobic tank 40 (the sludge return step).

In order to maintain the amount of sludge in the aerobic tank 40 at a prescribed level, some of the concentrated sludge is removed, for example periodically, through the sludge discharge line 32 that branches from the sludge return line 30 (the sludge removal step).

The water treatment method and water treatment device according to this embodiment can be introduced not only in deep reaction tanks (for example, having an effective water depth of about 10 m), but also in widely used standard tanks (having an effective water depth of 5 m or less), and can perform aerobic biological treatment of water to be treated that contains organic matter and the like, and can also improve the treatment of nitrogen contaminants in the water to be treated while suppressing the energy consumption required for aeration. Accordingly, widely used standard tanks do not require significant reconstruction work of the reaction tank body, meaning the introduction costs can be reduced. Further, the effects of concentration fluctuations in the quality of the inflow water can be reduced. The "effective depth" refers to the distance from the bottom of the reaction tank to the position of the water level during typical operation of the reaction tank.

In conventional activated sludge treatments, in terms of the solid-liquid separability of the sludge, increasing the sludge concentration has proven difficult (for example, in sewage treatment, the sludge concentration is typically an MLSS value of 1,000 to 2,000 mg/L), but by introducing sludge containing granules into the aerobic tank 40, the settling properties of the sludge improve, the MLSS can be increased (for example, in the case of sewage treatment, an MLSS value of about 3,000 to 5,000 mg/L), and the nitrogen removal rate can be increased. The amount of MLSS in the aerobic tank 40 may be at least 2,000 mg/L, and may be within a range from 3,000 to 10,000 mg/L. If the amount of MLSS in the aerobic tank 40 is less than 2,000 mg/L, then denitrification may sometimes not proceed in the aerobic tank.

Although there are no particular limitations on the installation location for the ammonium nitrogen concentration measurement device 16 in the aerobic tank 40, the installation location may be an end portion of the aerobic tank 40. Here, an "end portion" of the aerobic tank 40 refers to a portion 1/20 to 1/5 of the total length of the aerobic tank 40 from the downstream end face of the aerobic tank 40, and the installation location may be a location 1/8 of the total length from the downstream end face.

The amount of aeration by the blower 18 may be controlled so that the ammonium nitrogen concentration at the outflow portion of the aerobic tank 40 falls within a range from at least 0.5 mgN/L to not more than 5 mgN/L, and may be controlled so that the ammonium nitrogen concentration falls within a range from at least 1 mgN/L to not more than 3 mgN/L. If the ammonium nitrogen concentration at the outflow portion of the aerobic tank 40 is less than 0.5 mgN/L, then there is a possibility that the increase in the dissolved oxygen concentration may make it difficult for the denitrification reaction in the aerobic tank 40 to proceed. On the other hand, if the ammonium nitrogen concentration at the outflow portion of the aerobic tank 40 exceeds 5 mgN/L, then there is a possibility that production of the nitrate required for the denitrification may slow, leading to a reduction in the nitrogen removal rate.

The granules may be formed in the granule formation tank 14 installed outside the biological treatment device 10 and then supplied to the biological treatment device 10 from the granule formation tank 14, or a portion of the aerobic tank 40 of the biological treatment device 10 may be partitioned off and used as the granule formation tank 14, with the granules being formed inside the aerobic tank 40 of the biological treatment device 10 without providing a separate granule formation tank 14. In terms of enabling stable formation of the granules, the granules may be formed in the granule formation tank 14 installed outside the biological treatment device 10, or that a portion of the aerobic tank 40 of the biological treatment device 10 is partitioned off to provide a granule formation tank, with the granules being formed inside this granule formation tank and then supplied from the granule formation tank to the biological treatment device 10.

The granule formation tank 14 may be operated using any process that forms granules, and there are no particular limitations. Examples of the granule formation tank 14 include a reaction tank that employs a sequencing batch reactor (SBR), an upflow sludge blanket (USB) reactor, and an upflow anaerobic sludge blanket (UASB) reactor. In those cases where stable granule formation is required, and application to sewage treatment is considered, the granule formation tank 14 may be a reaction tank that employs a sequencing batch reactor (SBR).

The particle size of the granules may be at least 200 µm, and may be from 200 to 500 µm. If the particle size of the granules is less than 200 µm, then increasing the nitrogen removal rate may sometimes become difficult.

The settling properties of the sludge inside the aerobic tank 40, expressed as an SVI in the presence of the granules, may be not more than 100 mL/g, and may be 80 mL/g or less. If the settling properties of the sludge include an SVI that exceeds 100 mL/g, then increasing the nitrogen removal rate may sometimes become difficult.

The abundance ratio of the granules within the sludge in the aerobic tank 40 may be at least 15%, and may be 30% or higher. If the abundance ratio of the granules is less than 15%, then keeping the SVI of the sludge low becomes problematic, and as a result, maintaining the nitrogen removal rate at a high level may sometimes become difficult. There are no particular limitations on the method used for ascertaining the abundance ratio of the granules, and a particle size distribution analyzer such as a laser diffraction system may be used, or dry weight measurement of a sample that has been subjected to particle size classification by sieving may be used.

The water to be treated may be any water that contains organic matter and a nitrogen component, and although there are no particular limitations, examples include sewage, and industrial wastewater (such as food plant wastewater and electronic industry wastewater) and the like. The water quality of the water to be treated is, for example, typically within a range from 10 to 10,000 mg/L expressed as BOD (biological oxygen demand), or within a range from 5 to 500 mgN/L expressed as TN (total nitrogen). The water quality of sewage is, for example, typically within a range from 30 to 200 mg/L expressed as BOD (biological oxygen demand), or within a range from 5 to 40 mgN/L expressed as TN (total nitrogen), wherein almost all of that nitrogen is composed of ammonium nitrogen.

The aerobic tank 40 may be a deep reaction tank having an effective water depth of about 10 m or a standard tank having an effective water depth of 5 m or less, but may be a widely used standard tank.

In those cases where the water to be treated also contains phosphorus in addition to the organic matter and nitrogen component, treatment in the water treatment device 1 of FIG. 1 may be conducted in the manner described below.

Embodiment 2

In the water treatment device 1 of FIG. 1, a water to be treated containing organic matter, a nitrogen component and phosphorus passes through the water to be treated line 24, and is supplied to the aerobic tank 40 of the biological treatment device 10. The aerobic tank 40 is a continuous reaction tank that conducts treatment using a simulated AO method (simulated anaerobic/aerobic activated sludge method) aimed at treating organic matter and phosphorus, in which aeration is performed by supplying an oxygen-containing gas such as air from the blower 18 through the aeration device 20, the inside of the tank is stirred, and an aerobic state can be maintained, but in which aeration is either stopped or weakened at the upstream end portion (inflow portion) of the tank to maintain an anaerobic state. On the other hand, a portion of the water to be treated passes through the water to be treated line 34 and is supplied to the granule formation tank 14, granules containing polyphosphate-accumulating organisms are formed in the granule formation tank 14 (the granule formation step), and the formed granules are supplied to the aerobic tank 40 through the granule line 36. In the water treatment device 1, granules may also be formed inside the aerobic tank 40 of the biological treatment device 10, without providing a separate granule formation tank 14.

In the aerobic tank 40, the continuous inflow of the water to be treated and the sludge containing the granules are mixed, and at the upstream end portion of the aerobic tank 40, hydrolysis from polyphosphoric acid to phosphoric acid and the production of polyhydroxyalkanoic acids (PHA) occur inside the cells of the polyphosphate-accumulating organisms under anaerobic conditions, and excess phosphoric acid inside the cells is then discharged from the cells. Then, in the aerobic conditions downstream from the upstream end portion of the tank, decomposition of the organic matter by organic matter-oxidizing bacteria and conversion of ammonium nitrogen to nitrite nitrogen ($NO_2$) or nitrate nitrogen ($NO_3$) by nitrifying bacteria (a nitrification reaction) occur, and a reaction in which an amount of phosphoric acid exceeding that discharged under anaerobic conditions is absorbed as polyphosphoric acid by the polyphosphate-accumulating organisms also occurs. Moreover, as described above, within the interior of the granules, the conversion of nitrite nitrogen ($NO_2$) or nitrate nitrogen ($NO_3$) to nitrogen ($N_2$) (a denitrification reaction) occurs under anaerobic conditions (the biological treatment step).

When the water treatment method and water treatment device according to this embodiment are used to conduct a simulated AO method aimed at biologically removing phosphorus from a water to be treated that contains phosphorus, a treatment method and treatment device that enable stable phosphorus removal performance can be achieved.

During phosphorus removal, the sewage concentration may sometimes decrease dramatically in a combined sewage treatment or the like, and as a result, the amount of dissolved oxygen (DO) in the tank may increase, meaning the DO in the return sludge is supplied to the portion under anaerobic conditions, with the resulting increase in the redox potential of the anaerobic conditions portion causing a deterioration in the phosphorus removal rate, but by using a treatment method that employs a sludge that contains granules, the amount of DO in the return sludge can be suppressed to a low level, and any increase in the redox potential of the anaerobic conditions portion can be suppressed. Further, by adjusting the air volume arising from the ammonium nitrogen concentration, any increase in the amount of DO can be suppressed.

In those cases where the water to be treated contains phosphorus, the phosphorus concentration is, for example, typically within a range from 0.1 mg/L to 30 mg/L.

The upstream end portion in which aeration is either stopped or weakened is, for example, a portion 1/20 to 1/3 of the total length of the aerobic tank 40 from the upstream end face of the aerobic tank 40.

Embodiment 3

Figure 2:
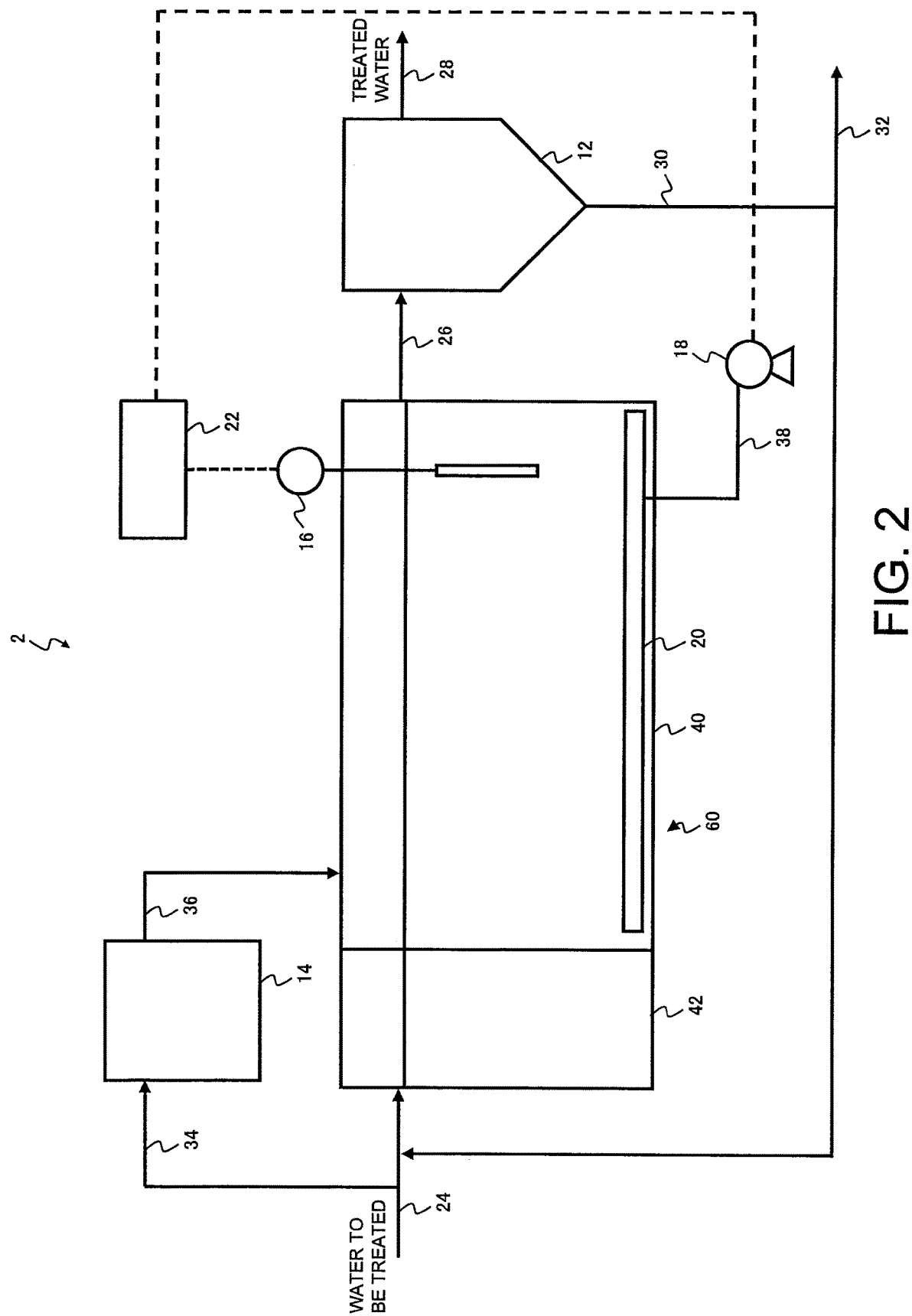
FIG. 2 is a schematic structural diagram illustrating another example of a water treatment device according to an embodiment of the present disclosure.

A schematic illustration of another example of a water treatment device according to an embodiment of the present disclosure is shown in FIG. 2. The water treatment device 2 of FIG. 2 contains a biological treatment device 60 containing an anaerobic tank 42, an aerobic tank 40 and a blower 18, a solid-liquid separation device 12, a sludge return line 30, an ammonium nitrogen concentration measurement device 16, and a control device 22. The water treatment device 2 may also include a granule formation tank 14 installed outside the biological treatment device 60.

In the water treatment device 2 of FIG. 2, a water to be treated line 24 is connected to a water to be treated inlet of the anaerobic tank 42 of the biological treatment device 60. The outlet of the aerobic tank 40 and the inlet of the solid-liquid separation device 12 are connected by a biologically treated liquid line 26. A treated water line 28 is connected to the treated water outlet of the solid-liquid separation device 12. A sludge outlet in the lower portion of the solid-liquid separation device 12 and a location partway along the water to be treated line 24 are connected by a sludge return line 30. A sludge discharge line 32 is connected partway along the sludge return line 30. A location on the water to be treated line 24 on the upstream side of the connection point for the sludge return line 30 and the inlet of the granule formation tank 14 are connected by a water to be treated line 34. The outlet of the granule formation tank 14 and the granule inlet of the aerobic tank 40 of the biological treatment device 60 are connected by a granule line 36. An aeration device 20 is installed in the bottom of the aerobic tank 40 of the biological treatment device 60, and the gas supply side of the blower 18 is connected to the aeration device 20 by a gas supply line 38. The ammonium nitrogen concentration measurement device 16 is installed, for example, in an end portion of the aerobic tank 40 of the biological treatment device 60. The ammonium nitrogen concentration measurement device 16 and the blower 18 are connected to the control device 22 by an electrical connection or the like.

The biological treatment device 60 is a continuous reaction tank that conducts treatment using an AO method (anaerobic/aerobic activated sludge method) that targets the treatment of organic matter and phosphorus, in which the upstream anaerobic tank 42 can be maintained in an anaerobic state, whereas in the downstream aerobic tank 40, aeration is performed by supplying an oxygen-containing gas such as air from the blower 18 through the aeration device 20, the inside of the tank is stirred, and an aerobic state can be maintained. The water to be treated containing organic matter, a nitrogen component and phosphorus passes through the water to be treated line 24 and is supplied to the anaerobic tank 42 of the biological treatment device 10. On the other hand, a portion of the water to be treated passes through the water to be treated line 34 and is supplied to the granule formation tank 14, granules containing polyphosphate-accumulating organisms are formed in the granule formation tank 14 (the granule formation step), and the formed granules are supplied to the aerobic tank 40 through the granule line 36. In the water treatment device 2, granules may also be formed inside the aerobic tank 40 of the biological treatment device 60, without providing a separate granule formation tank 14.

The anaerobic tank 42 may be provided with a stirring device such as a stirring blade, so that in the anaerobic tank 42, the continuous inflow of the water to be treated and the sludge containing the granules are stirred under anaerobic conditions. The sludge mixed liquid that has been stirred in the anaerobic tank 42 is introduced continuously into the aerobic tank 40. In the anaerobic tank 42, hydrolysis from polyphosphoric acid to phosphoric acid and the production of polyhydroxyalkanoic acids (PHA) occur inside the cells of the polyphosphate-accumulating organisms under anaerobic conditions, and excess phosphoric acid inside the cells is then discharged from the cells. Then, by introducing the sludge mixed liquid inside the anaerobic tank 42 into the aerobic conditions of the aerobic tank 40, decomposition of the organic matter by organic matter-oxidizing bacteria, conversion of ammonium nitrogen to nitrite nitrogen ($NO_2$) or nitrate nitrogen ($NO_3$) by nitrifying bacteria (a nitrification reaction), and a reaction in which an amount of phosphoric acid exceeding that discharged under anaerobic conditions is absorbed as polyphosphoric acid by the polyphosphate-accumulating organisms all occur. Moreover, as described above, within the interior of the granules, the conversion of nitrite nitrogen ($NO_2$) or nitrate nitrogen ($NO_3$) to nitrogen ($N_2$) (a denitrification reaction) occurs under anaerobic conditions (the biological treatment step).

During phosphorus removal, the sewage concentration may sometimes decrease dramatically in a combined sewage treatment or the like, and as a result, the amount of dissolved oxygen (DO) in the tank may increase, meaning the DO in the return sludge is supplied to the anaerobic tank, with the resulting increase in the redox potential of the anaerobic tank causing a deterioration in the phosphorus removal rate, but by using a treatment method that employs a sludge that contains granules, the amount of DO in the return sludge can be suppressed to a low level, and any increase in the redox potential of the anaerobic tank 42 can be suppressed. Further, by adjusting the air volume arising from the ammonium nitrogen concentration, any increase in the amount of DO can be suppressed.

The volume of the anaerobic tank 42 may be, for example, within a range from 1/20 to 1/3 of the volume of the aerobic tank 40.

Embodiment 4

Figure 3:
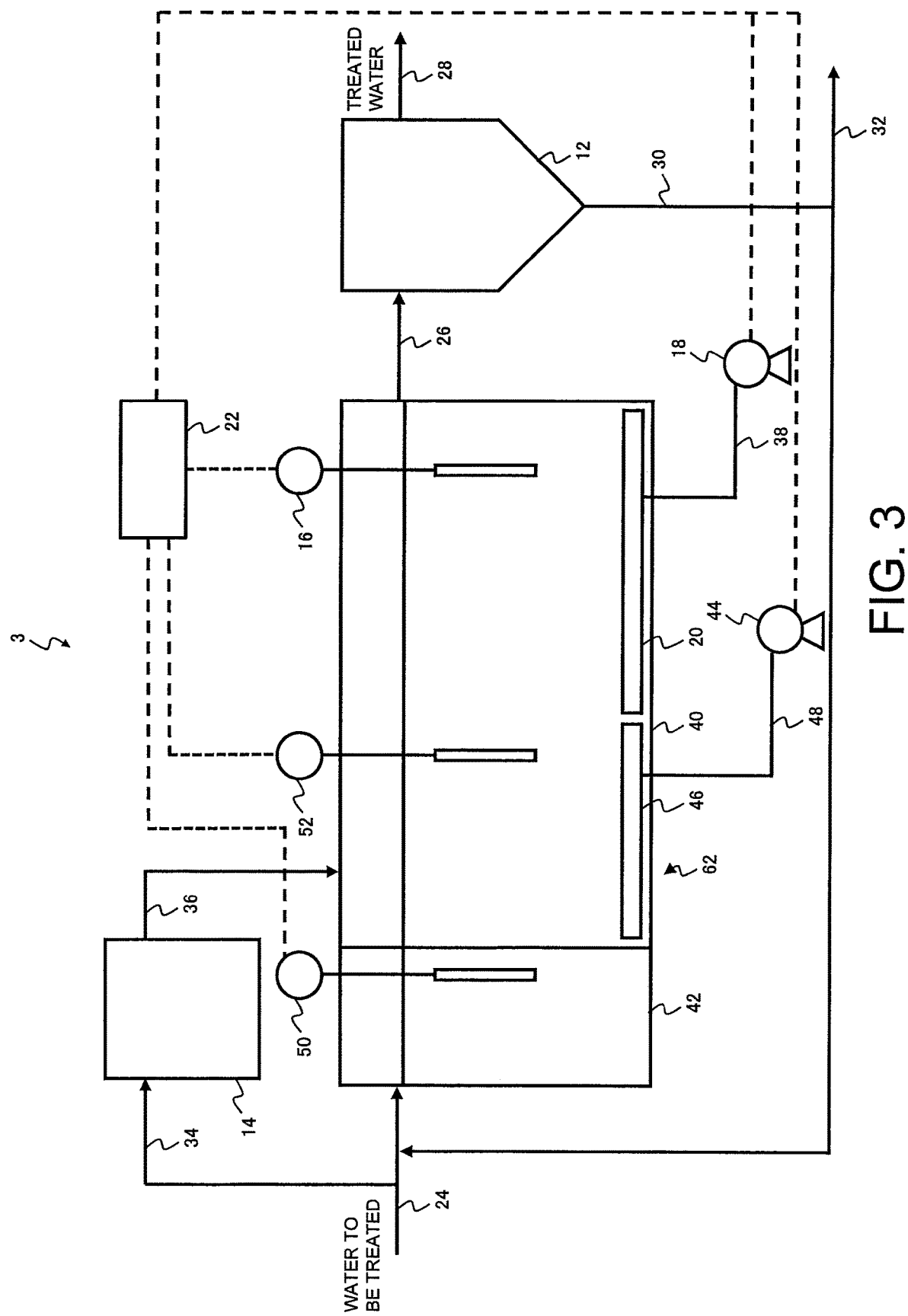
FIG. 3 is a schematic structural diagram illustrating another example of a water treatment device according to an embodiment of the present disclosure.

A schematic illustration of another example of a water treatment device according to an embodiment of the present disclosure is shown in FIG. 3. The water treatment device 3 of FIG. 3 is a structure similar to that of the water treatment device 2 of FIG. 2, but in which an ammonium nitrogen concentration measurement device for gauging the degree of progression of the nitrification reaction is not only provided in the end portion of the aerobic tank 40, but is provided at a plurality of locations. The water treatment device 3 of FIG. 3 contains a biological treatment device 62 having an anaerobic tank 42, an aerobic tank 40 and blowers 18 and 44, a solid-liquid separation device 12, a sludge return line 30, ammonium nitrogen concentration measurement devices 50, 52 and 16, and a control device 22. The water treatment device 3 may also include a granule formation tank 14 installed outside the biological treatment device 62.

In the water treatment device 3 of FIG. 3, a water to be treated line 24 is connected to a water to be treated inlet of the anaerobic tank 42 of the biological treatment device 62. The outlet of the aerobic tank 40 and the inlet of the solid-liquid separation device 12 are connected by a biologically treated liquid line 26. A treated water line 28 is connected to the treated water outlet of the solid-liquid separation device 12. A sludge outlet in the lower portion of the solid-liquid separation device 12 and a location partway along the water to be treated line 24 are connected by a sludge return line 30. A sludge discharge line 32 is connected partway along the sludge return line 30. A location on the water to be treated line 24 on the upstream side of the connection point for the sludge return line 30 and the inlet of the granule formation tank 14 are connected by a water to be treated line 34. The outlet of the granule formation tank 14 and the granule inlet of the aerobic tank 40 of the biological treatment device 62 are connected by a granule line 36. Aeration devices 46 and 20 are installed in the bottom of the aerobic tank 40 of the biological treatment device 62, the gas supply side of the blower 44 is connected to the aeration device 46 by a gas supply line 48, and the gas supply side of the blower 18 is connected to the aeration device 20 by a gas supply line 38. The ammonium nitrogen concentration measurement device 50 is installed in the anaerobic tank 42 of the biological treatment device 62, the ammonium nitrogen concentration measurement device 52 is installed in the central portion of the aerobic tank 40, and the ammonium nitrogen concentration measurement device 16 is installed in an end portion of the aerobic tank 40. The ammonium nitrogen concentration measurement devices 50, 52 and 16 and the blowers 18 and 44 are connected to the control device 22 by electrical connections or the like.

In the water treatment device 3, the ammonium nitrogen concentration entering the aerobic tank 40 is measured in the anaerobic tank 42 by the ammonium nitrogen concentration measurement device 50, and the ammonium nitrogen concentration is also measured in the central portion of the aerobic tank 40 by the ammonium nitrogen concentration measurement device 52 and in the end portion of the aerobic tank 40 by the ammonium nitrogen concentration measurement device 16. Aeration of the upstream portion of the aerobic tank 40 is controlled based on the ammonium nitrogen concentration measured by the ammonium nitrogen concentration measurement device 52 installed in the central portion of the aerobic tank 40, while aeration of the subsequent downstream portion of the aerobic tank 40 is controlled based on the ammonium nitrogen concentration measured by the ammonium nitrogen concentration measurement device 16 installed in the end portion of the aerobic tank 40. This is effective in those cases where the aerobic tank 40 that functions as a continuous reaction tank has a long shape in the lengthwise direction (for example, 50 m or longer), or in those cases where the aerobic tank is partitioned into a plurality of sections using partition walls.

The installation location for the ammonium nitrogen concentration measurement device 52 in the central portion of the aerobic tank 40 may be any location upstream of the ammonium nitrogen concentration measurement device 16 installed in the end portion of the aerobic tank 40, and although there are no particular limitations, the installation location may be a location within a range from ⅛ to ¾ of the total length of the aerobic tank 40 along the lengthwise direction from the upstream end face of the aerobic tank 40.

First, the ammonium nitrogen concentration in the mixed liquid flowing into the aerobic tank 40 measured by the ammonium nitrogen concentration measurement device 50 in the anaerobic tank 42 is fed into the control device 22. Based on that value, a target value is determined for the ammonium nitrogen concentration in the central portion of the aerobic tank 40, and an output value is determined for the blower 44 used for aerating the upstream portion of the aerobic tank 40. Further, in terms of the downstream portion of the aerobic tank 40, the output of the blower 18 is determined in a similar manner to that described for the water treatment device 1 of FIG. 1, so as to achieve the prescribed ammonium nitrogen concentration value that has been input into the control device 22.

In terms of the control that is performed based on the ammonium nitrogen concentration measured by the ammonium nitrogen concentration measurement device 52 installed in the central portion of the aerobic tank 40, the ammonium nitrogen concentration is controlled so as to yield a value that may be within a range from 5 to 50%, and may be from 30 to 40%, of that of the mixed liquid flowing into the aerobic tank 40. If this value is less than 5%, then the nitrification reaction tends to proceed poorly in the upstream portion of the aerobic tank 40, and the denitrification reaction also proceeds poorly in the upstream portion of the aerobic tank 40. In contrast, if this value exceeds 50%, then oxidation of the organic matter tends to proceed in the upstream portion of the aerobic tank 40, the level of DO in the tank increases, and the denitrification may sometimes proceed poorly throughout the entire aerobic tank 40.

Embodiment 5

Figure 4:
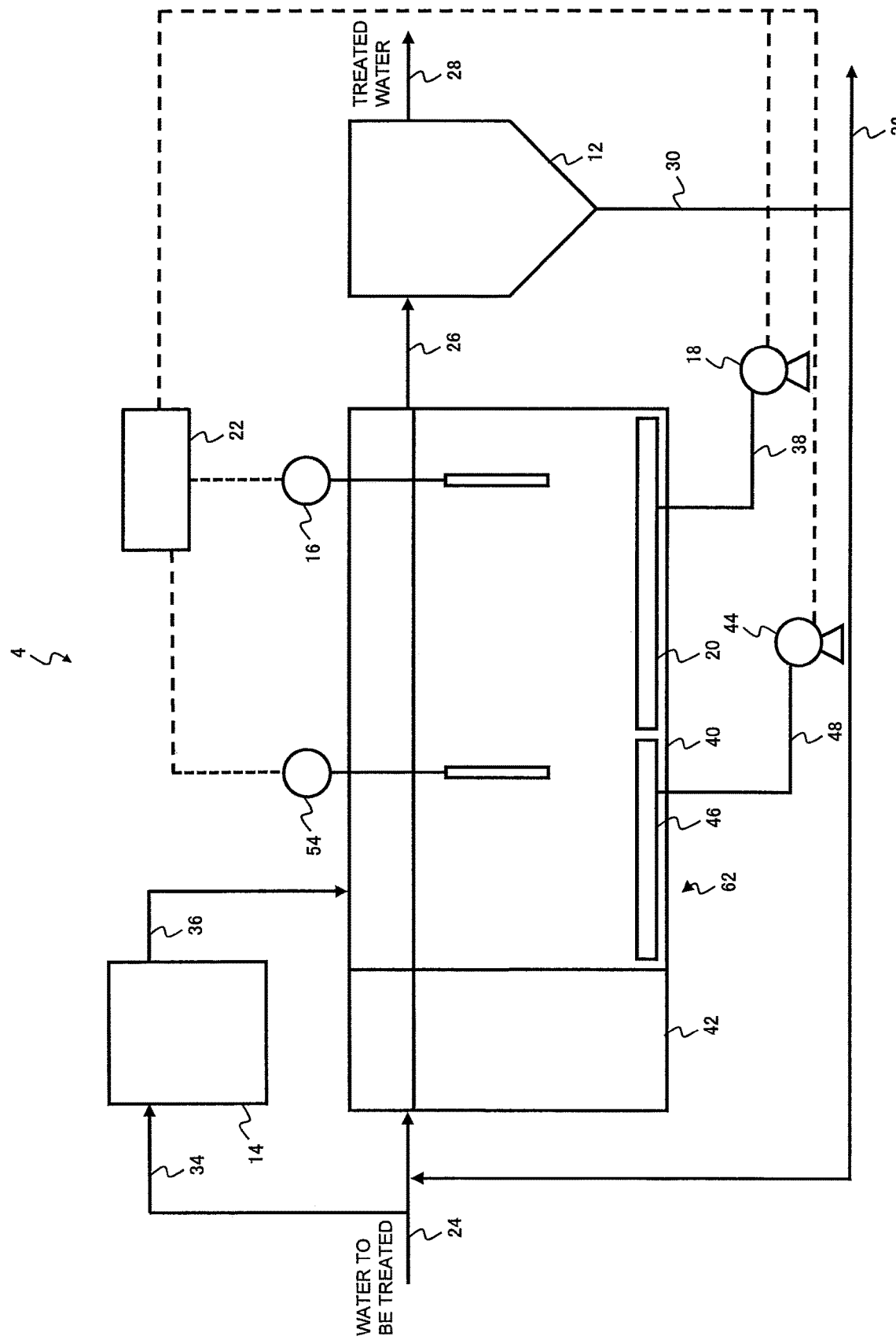
FIG. 4 is a schematic structural diagram illustrating another example of a water treatment device according to an embodiment of the present disclosure.

A schematic illustration of another example of a water treatment device according to an embodiment of the present disclosure is shown in FIG. 4. The water treatment device 4 of FIG. 4 is a structure similar to that of the water treatment device 3 of FIG. 3, but in which control of the upstream portion of the aerobic tank 40 is conducted using a nitrate concentration measurement device 54, which functions as a nitrate concentration measurement unit that acts as a water quality measurement unit, and is installed in the central portion of the aerobic tank 40. The water treatment device 4 of FIG. 4 contains a biological treatment device 62 having an anaerobic tank 42, an aerobic tank 40 and blowers 18 and 44, a solid-liquid separation device 12, a sludge return line 30, the nitrate concentration measurement device 54, an ammonium nitrogen concentration measurement device 16, and a control device 22. The water treatment device 4 may also include a granule formation tank 14 installed outside the biological treatment device 62.

In the water treatment device 4 of FIG. 4, the nitrate concentration measurement device 54 is installed in the central portion of the aerobic tank 40, and the ammonium nitrogen concentration measurement device 16 is installed in the end portion of the aerobic tank 40. The nitrate concentration measurement device 54, the ammonium nitrogen concentration measurement device 16, and the blowers 18 and 44 are connected to the control device 22 by electrical connections or the like.

In the water treatment device 4, the nitrate concentration is measured in the central portion of the aerobic tank 40 by the nitrate concentration measurement device 54, and the ammonium nitrogen concentration is measured in the end portion of the aerobic tank 40 by the ammonium nitrogen concentration measurement device 16. Aeration of the upstream portion of the aerobic tank 40 is controlled based on the nitrate concentration measured by the nitrate concentration measurement device 54 installed in the central portion of the aerobic tank 40, and aeration of the subsequent downstream portion of the aerobic tank 40 is controlled based on the ammonium nitrogen concentration measured by the ammonium nitrogen concentration measurement device 16 installed in the end portion of the aerobic tank 40. This is effective in those cases where the aerobic tank 40 that functions as a continuous reaction tank has a long shape in the lengthwise direction, or in those cases where the aerobic tank is partitioned into a plurality of sections using partition walls. In the water treatment device 4, a dissolved oxygen measurement device which functions as a dissolved oxygen measurement unit that acts as a water quality measurement unit may be installed instead of the nitrate concentration measurement device 54, with control of the upstream portion of the aerobic tank 40 then performed based on the dissolved oxygen concentration measured by the dissolved oxygen measurement device.

The installation location for the nitrate concentration measurement device 54 in the central portion of the aerobic tank 40 may be a location within a range from ⅛ to ¾ of the total length of the aerobic tank 40 along the lengthwise direction from the upstream end face of the aerobic tank 40.

First, the nitrate concentration in the mixed liquid measured by the nitrate concentration measurement device 54 in the central portion of the aerobic tank 40 is fed into the control device 22. Based on that value, an output value is determined for the blower 44 used for aerating the upstream portion of the aerobic tank 40. Further, in terms of the downstream portion of the aerobic tank 40, the output of the blower 18 is determined in a similar manner to that described for the water treatment device 1 of FIG. 1, so as to achieve the prescribed ammonium nitrogen concentration value that has been input into the control device 22.

In terms of the control that is performed based on the nitrate concentration measured by the nitrate concentration measurement device 54 installed in the central portion of the aerobic tank 40, the nitrate concentration may be not more than 10 mgN/L, and may be 5 mgN/L or less. If the nitrate concentration exceeds 10 mgN/L, then aerobic decomposition of the organic matter may sometimes progress, causing the denitrification in the aerobic tank 40 to proceed poorly.

Embodiment 6

Figure 5:
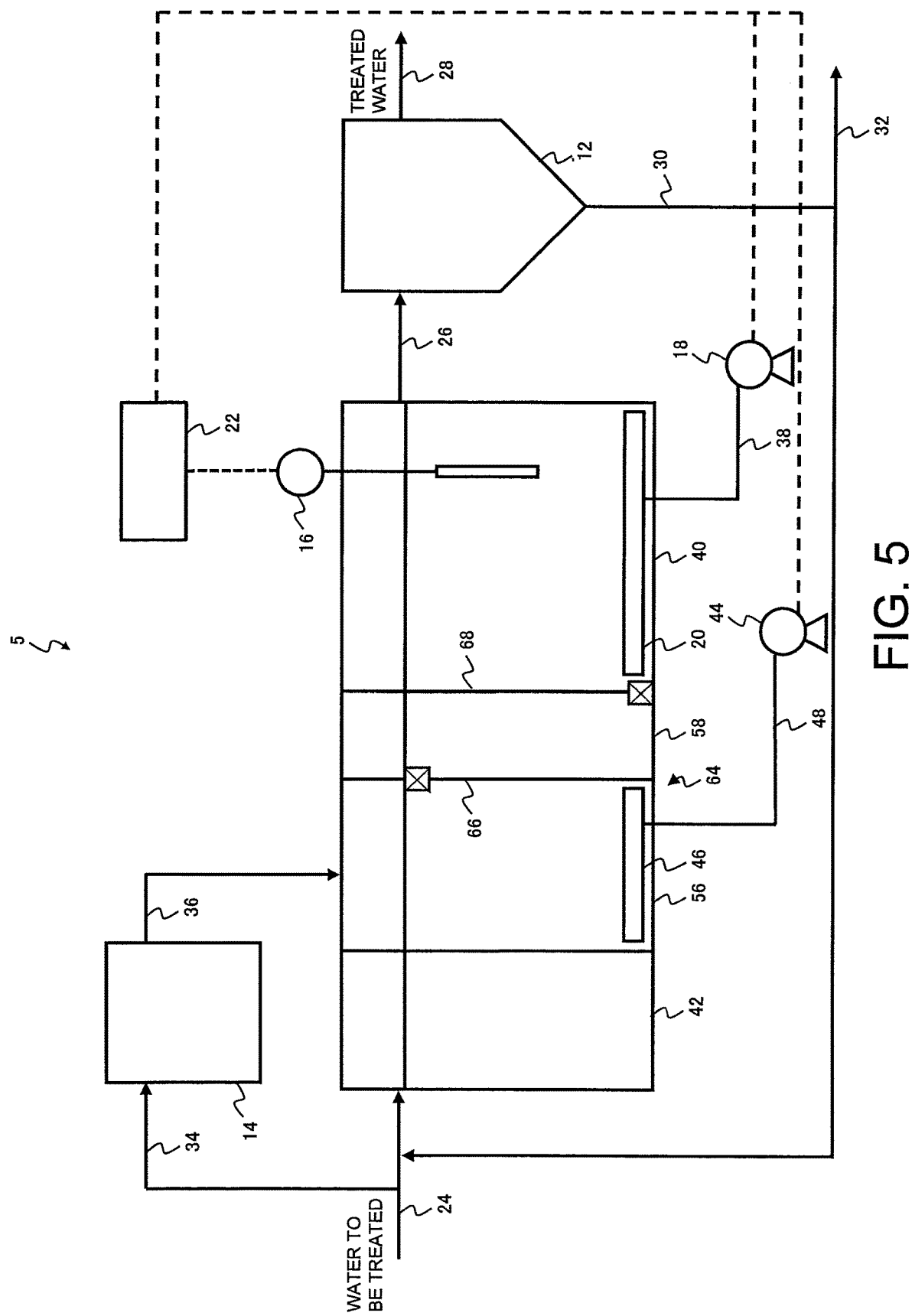
FIG. 5 is a schematic structural diagram illustrating another example of a water treatment device according to an embodiment of the present disclosure.

A schematic illustration of another example of a water treatment device according to an embodiment of the present disclosure is shown in FIG. 5. The water treatment device 5 of FIG. 5 is a configuration designed to achieve a more stable improvement in the denitrification rate. The water treatment device 5 of FIG. 5 contains a biological treatment device 64 having an anaerobic tank 42, aerobic tanks 56 and 40, an anoxic tank 58 and blowers 18 and 44, a solid-liquid separation device 12, a sludge return line 30, an ammonium nitrogen concentration measurement device 16, and a control device 22. Partition walls 66 and 68 are provided in the central portion of the aerobic tank, with the section between the partition wall 66 and the partition wall 68 becoming the anoxic tank 58 in which no aeration is performed. The water treatment device 5 may also include a granule formation tank 14 installed outside the biological treatment device 64.

In the water treatment device 5 of FIG. 5, a water to be treated line 24 is connected to a water to be treated inlet of the anaerobic tank 42 of the biological treatment device 64. The outlet of the aerobic tank 40 and the inlet of the solid-liquid separation device 12 are connected by a biologically treated liquid line 26. A treated water line 28 is connected to the treated water outlet of the solid-liquid separation device 12. A sludge outlet in the lower portion of the solid-liquid separation device 12 and a location partway along the water to be treated line 24 are connected by a sludge return line 30. A sludge discharge line 32 is connected partway along the sludge return line 30. A location on the water to be treated line 24 on the upstream side of the connection point for the sludge return line 30 and the inlet of the granule formation tank 14 are connected by a water to be treated line 34. The outlet of the granule formation tank 14 and the granule inlet of the aerobic tank 56 of the biological treatment device 64 are connected by a granule line 36. An aeration device 46 is installed in the bottom of the aerobic tank 56 of the biological treatment device 64, an aeration device 20 is installed in the bottom of the aerobic tank 40, the gas supply side of the blower 44 is connected to the aeration device 46 by a gas supply line 48, and the gas supply side of the blower 18 is connected to the aeration device 20 by a gas supply line 38. The ammonium nitrogen concentration measurement device 16 is installed in the end portion of the aerobic tank 40. The ammonium nitrogen concentration measurement device 16 and the blowers 18 and 44 are connected to the control device 22 by electrical connections or the like. A stirring device such as a stirring blade may be provided in the anoxic tank 58 to conduct stirring.

In the water treatment device 5, nitrification and denitrification reactions proceed simultaneously in the aerobic tank 56 upstream of the partition wall 66 and the aerobic tank 40 downstream of the partition wall 68, whereas in the anoxic tank 58, the inflowing nitrates and the organic matter accumulated in the sludge are used to perform a denitrification treatment.

The hydraulic retention time in the anoxic tank 58 may be within a range from 10 minutes to 120 minutes, and may be from 20 minutes to 60 minutes. If the hydraulic retention time in the anoxic tank 58 is less than 10 minutes, then the denitrification reaction may sometimes not proceed sufficiently, whereas if the hydraulic retention time exceeds 120 minutes, then the volume of the aerobic tank 40 decreases, and the nitrification and denitrification reactions inside the aerobic tank 40 may be impeded.

The installation location for the anoxic tank 58 may be a location within a range from ¼ to ¾ of the total length of the aerobic tank along the lengthwise direction from the upstream end face of the aerobic tank 56. An anoxic zone may also be formed in the aerobic tank without providing the partition wall 66 and the partition wall 68, by stopping aeration only in the middle portion of the aerobic tank 40, or by reducing the amount of aeration in a localized region sufficiently to stop the sludge from settling.

Embodiment 7

Figure 6:
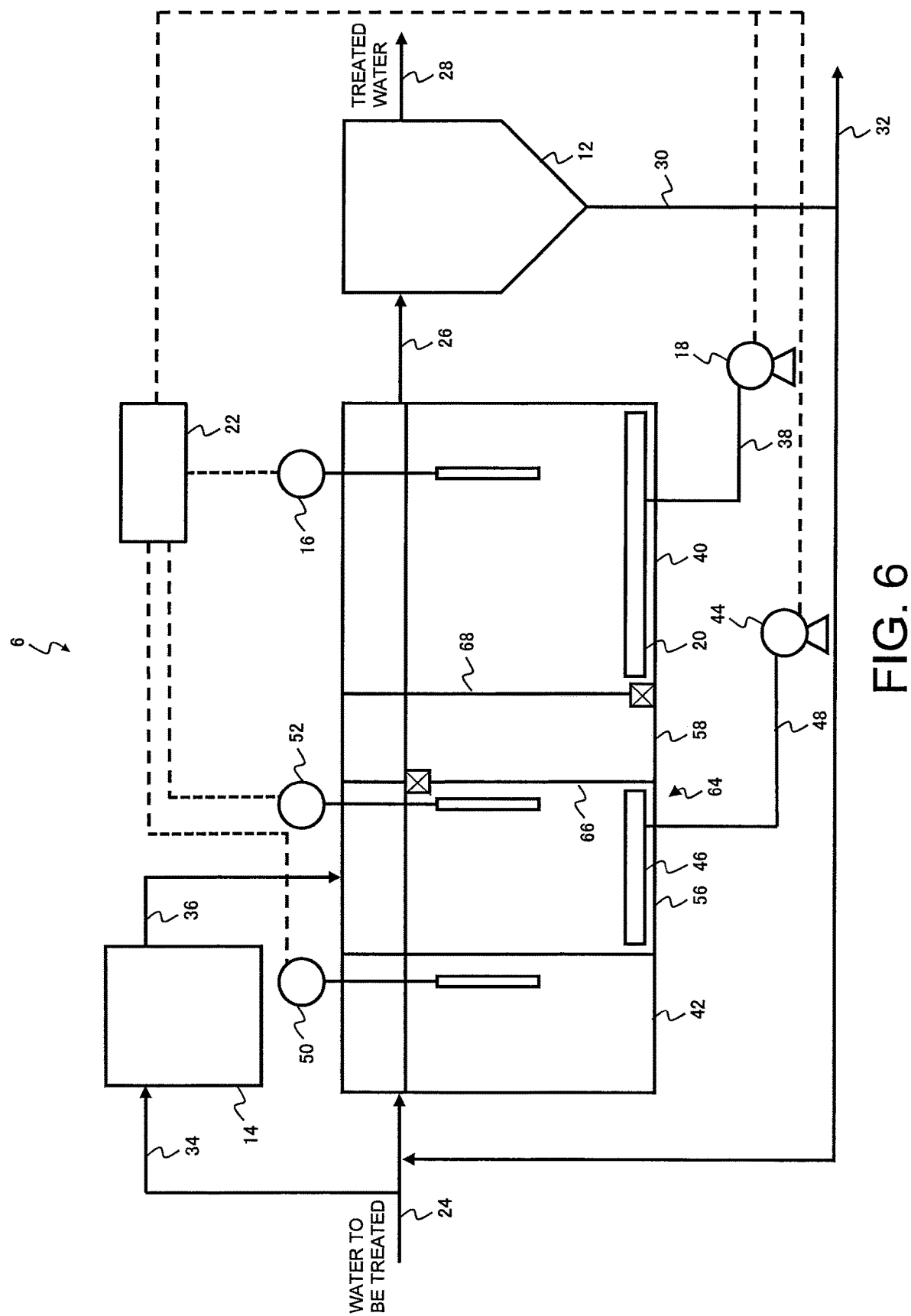
FIG. 6 is a schematic structural diagram illustrating another example of a water treatment device according to an embodiment of the present disclosure.

A schematic illustration of another example of a water treatment device according to an embodiment of the present disclosure is shown in FIG. 6. The water treatment device 6 of FIG. 6 is a structure similar to that of the water treatment device 5 of FIG. 5, but in which an ammonium nitrogen concentration measurement device for gauging the degree of progression of nitrification is not only provided in the end portion of the aerobic tank 40, but is installed at a plurality of locations. The water treatment device 6 of FIG. 6 contains a biological treatment device 64 having an anaerobic tank 42, aerobic tanks 56 and 40, an anoxic tank 58 and blowers 18 and 44, a solid-liquid separation device 12, a sludge return line 30, ammonium nitrogen concentration measurement devices 50, 52 and 16, and a control device 22. The water treatment device 6 may also include a granule formation tank 14 installed outside the biological treatment device 64.

In the water treatment device 6 of FIG. 6, the ammonium nitrogen concentration measurement device 50 is installed in the anaerobic tank 42 of the biological treatment device 64, the ammonium nitrogen concentration measurement device 52 is installed in the aerobic tank 56, and the ammonium nitrogen concentration measurement device 16 is installed in the end portion of the aerobic tank 40. The ammonium nitrogen concentration measurement devices 50, 52 and 16 and the blowers 18 and 44 are connected to the control device 22 by electrical connections or the like.

In the water treatment device 6, the ammonium nitrogen concentration entering the aerobic tank 56 is measured in the anaerobic tank 42 by the ammonium nitrogen concentration measurement device 50, and the ammonium nitrogen concentration is also measured in the aerobic tank 56 by the ammonium nitrogen concentration measurement device 52 and in the end portion of the aerobic tank 40 by the ammonium nitrogen concentration measurement device 16. Aeration of the aerobic tank 56 is controlled based on the ammonium nitrogen concentration measured by the ammonium nitrogen concentration measurement device 52 installed in the aerobic tank 56, while aeration of the subsequent aerobic tank 40 is controlled based on the ammonium nitrogen concentration measured by the ammonium nitrogen concentration measurement device 16 installed in the end portion of the aerobic tank 40. In the water treatment device 6, nitrification and denitrification reactions proceed simultaneously in the aerobic tank 56 upstream of the partition wall 66 and the aerobic tank 40 downstream of the partition wall 68, whereas in the anoxic tank 58, the inflowing nitrates and the organic matter accumulated in the sludge are used to perform a denitrification treatment.

First, the ammonium nitrogen concentration in the mixed liquid flowing into the aerobic tank 56 measured by the ammonium nitrogen concentration measurement device 50 in the anaerobic tank 42 is fed into the control device 22. Based on that value, a target value is determined for the ammonium nitrogen concentration in the aerobic tank 56, and an output value is determined for the blower 44 used for conducting aeration in the aerobic tank 56. Further, in the aerobic tank 40, the output of the blower 18 is determined in a similar manner to that described for the water treatment device 1 of FIG. 1, so as to achieve the prescribed ammonium nitrogen concentration value that has been input into the control device 22.

In terms of the control that is performed based on the ammonium nitrogen concentration measured by the ammonium nitrogen concentration measurement device 52 installed in the aerobic tank 56, the ammonium nitrogen concentration is controlled so as to yield a value that may be within a range from 5 to 50%, and may be from 10 to 40%, of that of the mixed liquid flowing into the aerobic tank 56. If this value is less than 5%, then the nitrification reaction tends to proceed poorly in the aerobic tank 56, and the denitrification reaction also proceeds poorly in the aerobic tank 56. In contrast, if this value exceeds 50%, then oxidation of the organic matter tends to proceed in the aerobic tank 56, the level of DO in the tank increases, and the denitrification may sometimes proceed poorly in the aerobic tank 56 and the aerobic tank 40.

Embodiment 8

Figure 7:
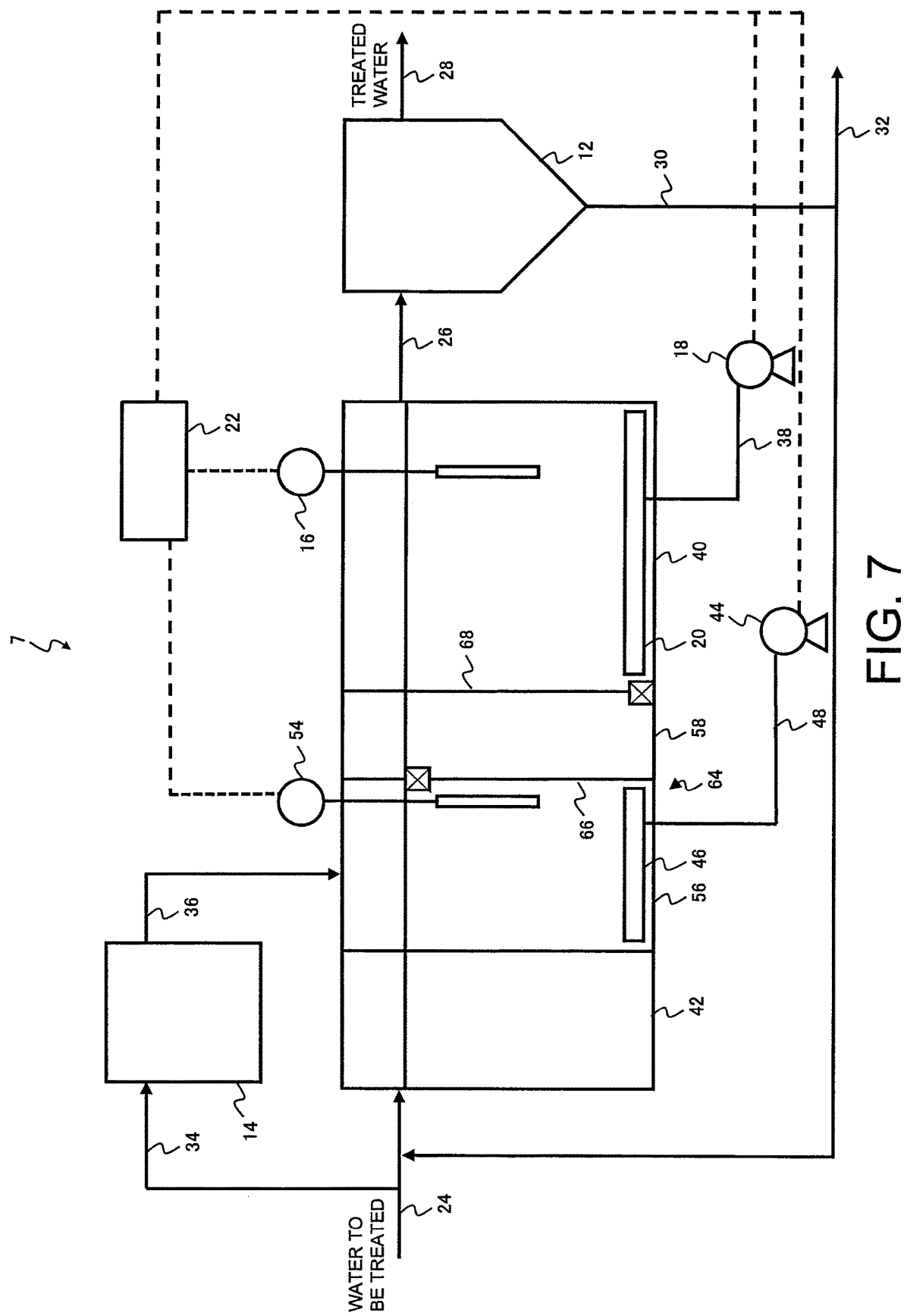
FIG. 7 is a schematic structural diagram illustrating another example of a water treatment device according to an embodiment of the present disclosure.

A schematic illustration of another example of a water treatment device according to an embodiment of the present disclosure is shown in FIG. 7. The water treatment device 7 of FIG. 7 is a structure similar to that of the water treatment device 6 of FIG. 6, but in which control of the aerobic tank 56 is conducted using a nitrate concentration measurement device 54, which functions as a nitrate concentration measurement unit that acts as a water quality measurement unit, and is installed in the aerobic tank 56. The water treatment device 7 of FIG. 7 contains a biological treatment device 64 having an anaerobic tank 42, aerobic tanks 56 and 40, an anoxic tank 58 and blowers 18 and 44, a solid-liquid separation device 12, a sludge return line 30, the nitrate concentration measurement device 54, an ammonium nitrogen concentration measurement device 16, and a control device 22. The water treatment device 7 may also include a granule formation tank 14 installed outside the biological treatment device 64.

In the water treatment device 7 of FIG. 7, the nitrate concentration measurement device 54 is installed in the aerobic tank 56, and the ammonium nitrogen concentration measurement device 16 is installed in the end portion of the aerobic tank 40. The nitrate concentration measurement device 54, the ammonium nitrogen concentration measurement device 16, and the blowers 18 and 44 are connected to the control device 22 by electrical connections or the like.

In the water treatment device 7, the nitrate concentration is measured in the aerobic tank 56 by the nitrate concentration measurement device 54, and the ammonium nitrogen concentration is measured in the end portion of the aerobic tank 40 by the ammonium nitrogen concentration measurement device 16. Aeration of the aerobic tank 56 is controlled based on the nitrate concentration measured by the nitrate concentration measurement device 54 installed in the aerobic tank 56, and aeration of the downstream aerobic tank 40 is controlled based on the ammonium nitrogen concentration measured by the ammonium nitrogen concentration measurement device 16 installed in the end portion of the aerobic tank 40. In the water treatment device 7, nitrification and denitrification reactions proceed simultaneously in the aerobic tank 56 upstream of the partition wall 66 and the aerobic tank 40 downstream of the partition wall 68, whereas in the anoxic tank 58, the inflowing nitrates and the organic matter accumulated in the sludge are used to perform a denitrification treatment. By performing control so that the nitrate nitrogen concentration flowing into the anoxic tank 58 satisfies a prescribed concentration, the denitrification reaction in the anoxic tank 58 is able to proceed reliably, and a more stable nitrogen removal rate can be achieved. In the water treatment device 7, a dissolved oxygen measurement device which functions as a dissolved oxygen measurement unit that acts as a water quality measurement unit may be installed instead of the nitrate concentration measurement device 54, with control of the aeration in the aerobic tank 56 then performed based on the dissolved oxygen concentration measured by the dissolved oxygen measurement device.

First, the nitrate concentration in the mixed liquid measured by the nitrate concentration measurement device 54 in the aerobic tank 56 is fed into the control device 22. Based on that value, an output value is determined for the blower 44 used for aerating the aerobic tank 56. Further, in the aerobic tank 40, the output of the blower 18 is determined in a similar manner to that described for the water treatment device 1 of FIG. 1, so as to achieve the prescribed ammonium nitrogen concentration value that has been input into the control device 22.

In terms of the control that is performed based on the nitrate concentration measured by the nitrate concentration measurement device 54 installed in the aerobic tank 56, the nitrate concentration may be within a range from 0.5 to 10 mgN/L, and may be within a range from 1 to 5 mgN/L. If the nitrate concentration is less than 0.5 mgN/L, then in some cases the nitrification reaction may proceed poorly in the aerobic tank 56, the denitrification reaction in the aerobic tank 56 may not occur, and an improvement in the removal rate by the denitrification reaction in the anoxic tank 58 may not be observed, whereas if the nitrate concentration exceeds 10 mgN/L, then aerobic decomposition of the organic matter may sometimes progress, causing the denitrification in the aerobic tank 56 and the aerobic tank 40 to proceed poorly.

EXAMPLES

The present disclosure is described below in further detail using a series of examples and comparative examples, but the present disclosure is in no way limited by the following examples.

Example 1

Figure 8:
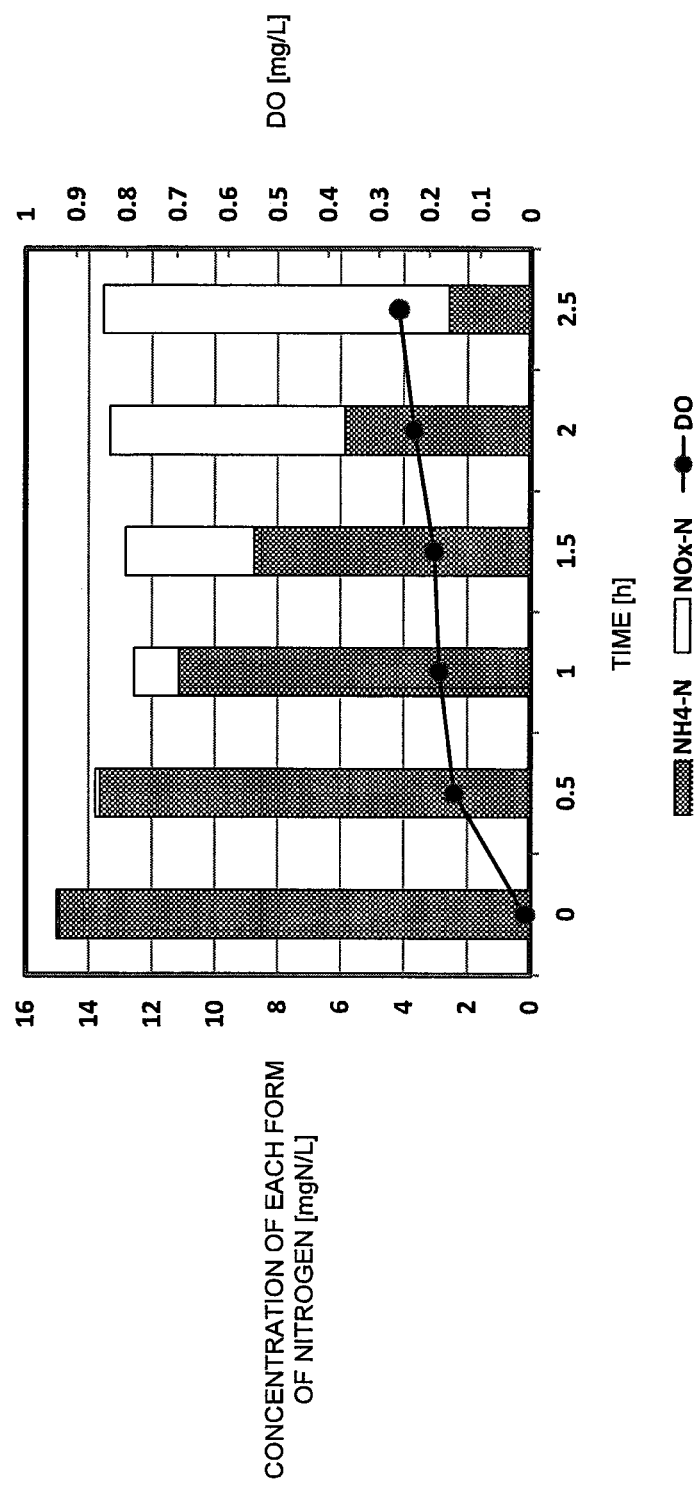
FIG. 8 is a graph illustrating the change in the concentration of each form of nitrogen in the batch test of Example 1.

First, a beaker test was performed to verify whether or not the nitrification and denitrification reactions were both able to occur under aerobic conditions. Using the flow illustrated in FIG. 2, a sludge that had been collected from a pilot plant running a continuous treatment test of sewage was used. Details regarding the operational system used in this pilot plant are described below. The sludge containing granules was extracted from the anaerobic tank and placed in a 3 L beaker. Subsequently, a slight aeration treatment of 0.3 L/min was conducted continuously in the aerobic tank, and a nitrification was performed while a stirring device having a stirring blade was used to form a completely mixed state. The change in the concentration of each form of nitrogen during the batch test is illustrated in FIG. 8. The ammonium nitrogen concentration at 0 hours was 15 mgN/L. As the aeration treatment was performed, a decrease in the ammonium nitrogen concentration was confirmed, and after one hour, the ammonium nitrogen concentration had decreased by 4 mgN/L to 11 mgN/L, but the production of nitrate nitrogen was able to be suppressed to a concentration of 1.4 mgN/L. In other words, under complete mixing conditions at beaker scale, denitrification of 2.6 mgN/L of nitrogen was confirmed.

Comparative Example 1

A sewage treatment test was conducted in an AO method reaction tank that did not include a granule formation tank. A continuous reaction tank with a total volume of 14 m$^3$ was used, composed of a width of 1 m, a water depth of 2 m and a lengthwise direction of 7 m, wherein the volume of the anaerobic tank was 3 m$^3$ and the volume of the aerobic tank was 11 m$^3$. A treated water from a first settling basin was used as the inflow water into the reaction tank, and water inflow was conducted continuously. The inflow rate of the sewage was 1.6 m$^3$/hr, and the aeration amount from the blower was controlled so that the DO measured by a dissolved oxygen meter (DO meter) in the end portion of the aerobic tank was 1 mg/L. The MLSS value was within a range from 1,500 to 2,000 mg/L, and the SVI was from 80 to 110 mL/g. A one-month flow test resulted in an average nitrogen removal rate of 43%.

Comparative Example 2

A sewage treatment test was conducted in an AO method reaction tank fitted with a granule formation tank, similar to the water treatment device illustrated in FIG. 2. A continuous reaction tank (anaerobic tank+aerobic tank) with a total volume of 14 m$^3$ was used, composed of a width of 1 m, a water depth of 2 m and a lengthwise direction of 7 m, wherein the volume of the anaerobic tank was 3 m$^3$ and the volume of the aerobic tank was 11 m$^3$. A treated water from a first settling basin was used as the inflow water into the anaerobic tank for the continuous reaction tank, and water inflow was conducted continuously. Granule formation was conducted by supplying a portion of the inflow water to the granule formation tank, and the granules were supplied to the aerobic of the continuous reaction tank. An SBR was used as the granule formation tank. The inflow rate of the sewage was 2.4 m$^3$/hr, and the aeration amount from the blower was controlled so that the DO measured by a DO meter in the end portion of the aerobic tank (installed at a location 1/7 of the total length of the aerobic tank from the downstream end face of the aerobic tank) was 1 mg/L. The MLSS value was within a range from 3,000 to 3,500 mg/L, and the SVI was from 70 mL/g. A one-month flow test resulted in an average nitrogen removal rate of 44%.

Figure 9:
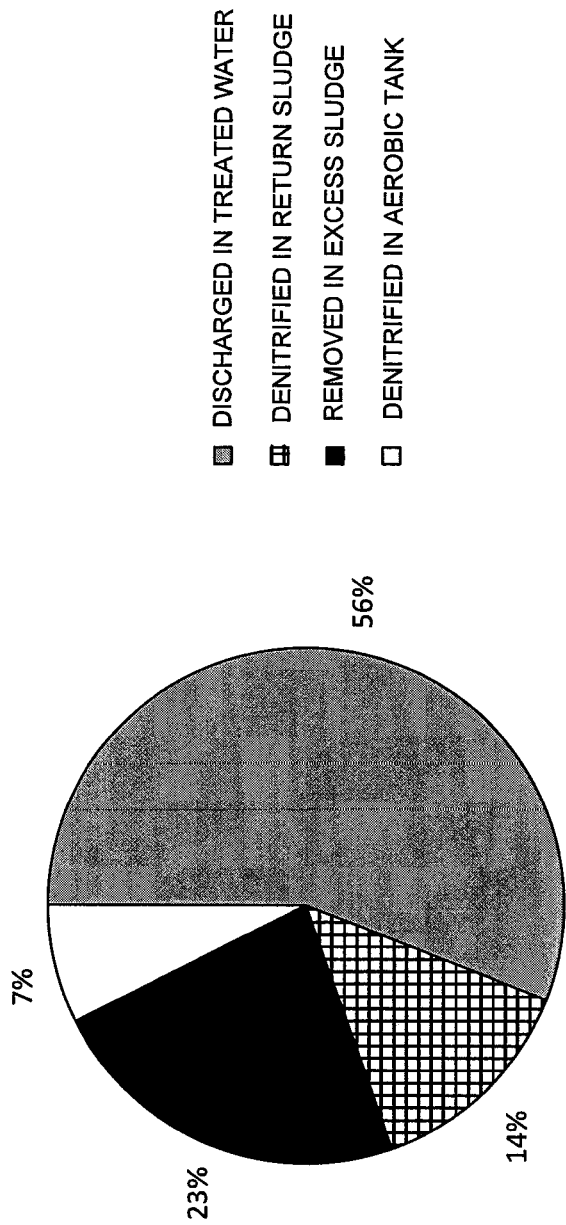
FIG. 9 is a graph illustrating the results of investigating the coming and going of the nitrogen in the inflow water during the test period in Comparative Example 2.

FIG. 9 is a graph illustrating the results of investigating the coming and going of the nitrogen in the inflow water during the test period in Comparative Example 2. Of the total nitrogen (TN) in the inflow water, the nitrogen in the outflow treated water represented 56%, the proportion of nitrogen denitrified by returning the nitrate in the return sludge to the anaerobic tank represented 14%, the proportion of nitrogen incorporated within the sludge and discharged as excess sludge represented 23%, and the proportion treated by the denitrification reaction inside the aerobic tank was 7%.

Comparative Example 3

Using the flow described in Comparative Example 1, an ammonia meter ($NH_4$—N meter) was installed in the end portion of the aerobic tank (at a location 1/7 of the total length of the aerobic tank from the downstream end face of the aerobic tank), and the amount of aeration provided by the blower to the aerobic tank was controlled based on the value from the ammonia meter. The target ammonium nitrogen control value was set to 1 mgN/L. The inflow rate of the sewage was 1.6 m$^3$/hr, the MLSS value was within a range from 1,500 to 1,800 mg/L, and the SVI was from 100 to 120 mL/g. An 18-day flow test resulted in an average nitrogen removal rate of 44%. Further, the DO value at the outflow portion from the aerobic tank changed about 0.6 to 0.8 mg/L.

Example 2

A sewage treatment test was conducted using the water treatment device illustrated in FIG. 2. Granule formation was conducted by supplying a portion of the inflow water to the granule formation tank, and the granules were supplied to the aerobic of the continuous reaction tank. An SBR was used as the granule formation tank. An ammonia meter ($NH_4$—N meter) was installed in the end portion of the aerobic tank (at a location 1/7 of the total length of the aerobic tank from the downstream end face of the aerobic tank), and the amount of aeration provided by the blower to the aerobic tank was controlled based on the value from the ammonia meter. The amount of aeration from the blower was controlled so as to achieve a target ammonium nitrogen control value of 1 mgN/L at the outflow portion of the aerobic tank. The inflow water rate was set to 2.4 m³/hr. The MLSS value was within a range from 3,300 to 3,800 mg/L, and the SVI was from 70 to 80 mL/g. An 18-day flow test resulted in an average nitrogen removal rate of 51%. Compared with the case where DO control was used, a 7-point increase in the nitrogen removal rate was confirmed. Even under continuous water treatment conditions using a shallow reaction tank with a water depth of only 2 m, an improvement in the nitrogen removal rate was confirmed.

Figure 10:
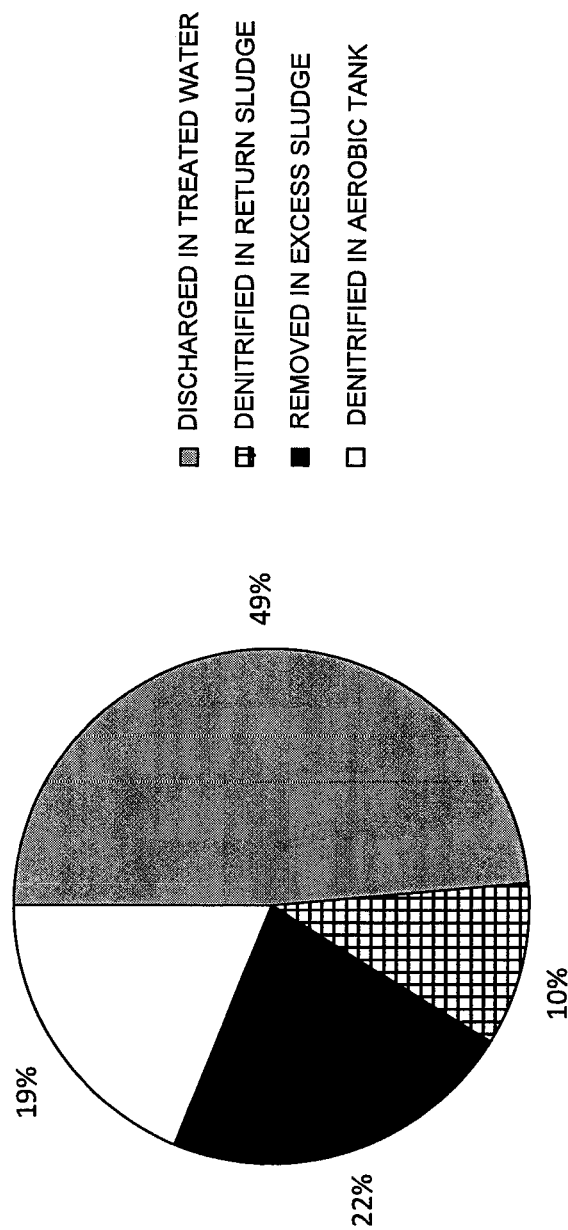
FIG. 10 is a graph illustrating the results of investigating the coming and going of the nitrogen in the inflow water during the test period in Example 2.

FIG. 10 is a graph illustrating the results of investigating the coming and going of the nitrogen in the inflow water during the test period in Example 2. Of the total nitrogen (TN) in the inflow water, the nitrogen in the outflow treated water represented 49%, the proportion of nitrogen denitrified by returning the nitrate in the return sludge to the anaerobic tank represented 10%, the proportion of nitrogen incorporated within the sludge and discharged as excess sludge represented 22%, and the proportion treated by the denitrification reaction inside the aerobic tank was 19%. Compared with Comparative Example 3, a 12-point increase was confirmed for the proportion of denitrification inside the aerobic tank. The DO at the outflow portion from the aerobic tank was about 0.3 to 0.5 mgN/L. It is thought that the fact that the DO moved lower compared with Comparative Example 3 was also a factor in promoting the denitrification inside the aerobic tank.

Example 3

Figure 11:
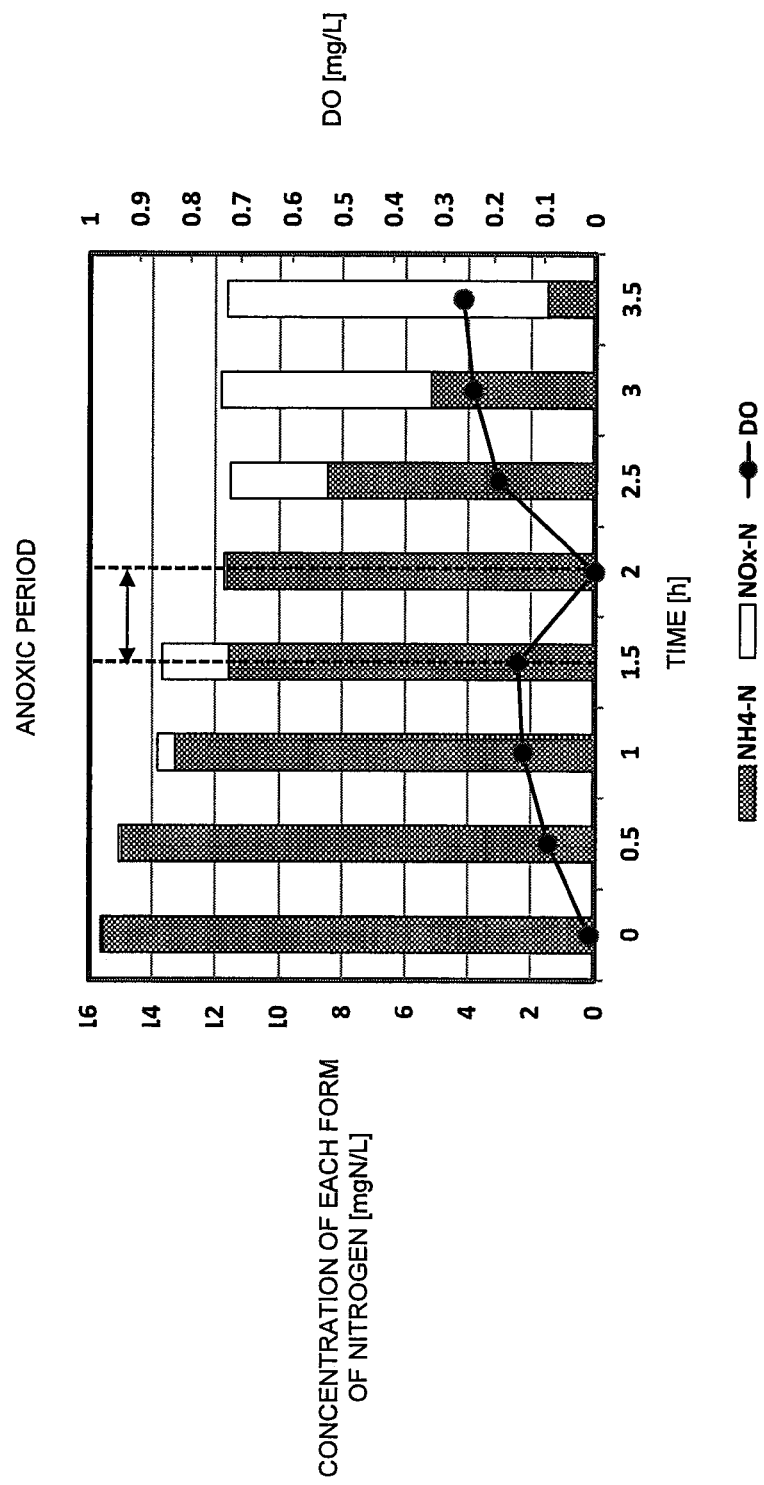
FIG. 11 is a graph illustrating the change in the concentration of each form of nitrogen the batch test of Example 3.

In a similar manner to Example 1, a sludge was collected from the anaerobic tank of a sewage water treatment test device fitted with a granule formation tank, and a beaker-scale batch test was performed. To simulate the installation of an anoxic tank inside the aerobic tank, a step was inserted in which aeration was halted for the period from 1.5 hours to 2 hours partway through the aeration treatment, with only stirring being conducted under anoxic conditions. After the 2-hour mark, the aeration treatment was restarted. The change in the concentration of each form of nitrogen in the batch test is illustrated in FIG. 11. The initial ammonium nitrogen concentration was 15.6 mgN/L. In the period before the anoxic step was started at 1.5 hours, the ammonium nitrogen concentration decreased to 11.6 mgN/L, and 2 mgN/L of NOx-N (the total of nitrite nitrogen and nitrate nitrogen) was produced. In other words, in the period prior to 1.5 hours, a 2 mgN/L denitrification reaction was confirmed. Subsequently, by inserting the anoxic step of 30 minutes, a rapid denitrification of the NOx-N that had been produced at the 1.5-hour mark down to a level of 0.1 mgN/L was confirmed.

Comparative Example 4

Using the AO method reaction tank that was not fitted with a granule formation tank from Comparative Example 1, partition walls were provided in the central portion of the aerobic tank to establish an anoxic tank in which aeration was not performed (located in a region from 1/2.75 to 1/2.2 of the total length of the aerobic tank in the lengthwise direction from the upstream end face of the aerobic tank). The structure of the reaction tank, in sequence from the upstream end of the reaction tank, included an anaerobic tank of 3 m³, an aerobic tank of 4 m³, an anoxic tank of 1 m³, and an aerobic tank of 6 m³. An ammonia meter was installed in the end portion of the aerobic tank (at a location 1/7 of the total length of the aerobic tank from the downstream end face of the aerobic tank), and the amount of aeration by the blower was controlled so that the ammonium nitrogen concentration at the outflow portion from the aerobic tank was 1 mgN/L. The inflow water rate was set to 1.6 m³/hr. The MLSS value was within a range from 1,500 to 2,000 mg/L, and the SVI was from 100 to 130 mL/g. A 20-day flow test resulted in an average nitrogen removal rate of 40%, with no improvement in the nitrogen removal rate observed compared with Comparative Example 3.

Example 4

Using the AO method reaction tank fitted with a granule formation tank from Example 2, partition walls were provided in the central portion of the aerobic tank to establish an anoxic tank in which aeration was not performed (FIG. 5) (located in a region from 1/2.75 to 1/2.2 of the total length of the aerobic tank in the lengthwise direction from the upstream end face of the aerobic tank). The structure of the reaction tank, in sequence from the upstream end of the reaction tank, included an anaerobic tank of 3 m³, an aerobic tank of 4 m³, an anoxic tank of 1 m³, and an aerobic tank of 6 m³. An ammonia meter was installed in the end portion of the aerobic tank (at a location 1/7 of the total length of the aerobic tank from the downstream end face of the aerobic tank), and the amount of aeration by the blower was controlled so that the ammonium nitrogen concentration at the outflow portion from the aerobic tank was 1 mgN/L. The inflow water rate was set to 2.4 m³/hr. The MLSS value was within a range from 3,400 to 3,900 mg/L, and the SVI was from 70 to 80 mL/g. A 20-day flow test resulted in an average nitrogen removal rate of 53%, with a 13-point increase in the nitrogen removal rate being confirmed compared with Comparative Example 4 in which a treatment test was conducted using a similar continuous reaction tank. Further, an increase in the maximum nitrogen removal rate to 60% was also confirmed.

Figure 12:
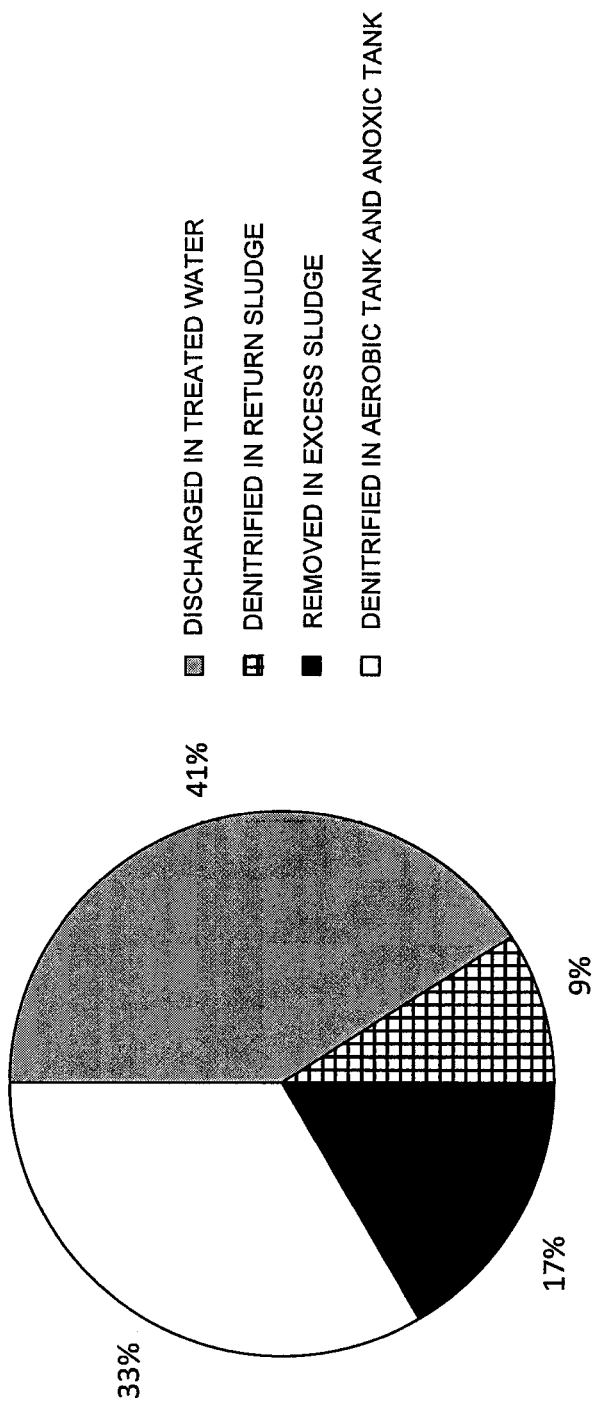
FIG. 12 is a graph illustrating the results of investigating the coming and going of the nitrogen in the inflow water during the test period in Example 4.

FIG. 12 is a graph illustrating the results of investigating the coming and going of the nitrogen in the inflow water during the test period in Example 4. Of the total nitrogen (TN) in the inflow water, the nitrogen in the outflow treated water represented 41%, the proportion of nitrogen denitrified by returning the nitrate in the return sludge to the anaerobic tank represented 9%, the proportion of nitrogen incorporated within the sludge and discharged as excess sludge represented 17%, and the proportion treated by the denitrification reactions inside the aerobic tank and the denitrification tank was 33%. A significant increase in the proportion of nitrogen treated by the denitrification reaction in the aerobic tank was confirmed compared with Comparative Example 2. The treatment test of this example represents a result using a reaction tank having a water depth of 2 m, a width of 1 m, and a length in the lengthwise direction of 7 m. If application to an actual facility (for example, a reaction tank having a shape with a water depth of 4 to 5 m, a width of 4 to 5 m, and a distance in the lengthwise direction of at least 100 m) is considered, then because a plug flow can be more easily generated, and aerobic BOD oxidation and nitrification reactions can be more easily moderated, a further increase in the denitrification rate can be anticipated.

The results of the above continuous water flow tests are summarized in Table 1.

TABLE 1

| Units | Granule supply — | Blower control — | Anoxic tank — | Inflow water rate m³/hr | MLSS mg/L | SVI mL/g | Average nitrogen removal rate — |
|---|---|---|---|---|---|---|---|
| Comparative Example 1 | no | DO meter | no | 1.6 | 1500 to 2000 | 80 to 110 | 43% |
| Comparative Example 2 | yes | DO meter | no | 2.4 | 3000 to 3500 | 70 | 44% |
| Comparative Example 3 | no | NH₄—N meter | no | 1.6 | 1500 to 1800 | 100 to 120 | 44% |
| Example 2 | yes | NH₄—N meter | no | 2.4 | 3300 to 3800 | 70 to 80 | 51% |
| Comparative Example 4 | no | NH₄—N meter | yes | 1.6 | 1500 to 2000 | 100 to 130 | 40% |
| Example 4 | yes | NH₄—N meter | yes | 2.4 | 3400 to 3900 | 70 to 80 | 53% |

Figure 13:
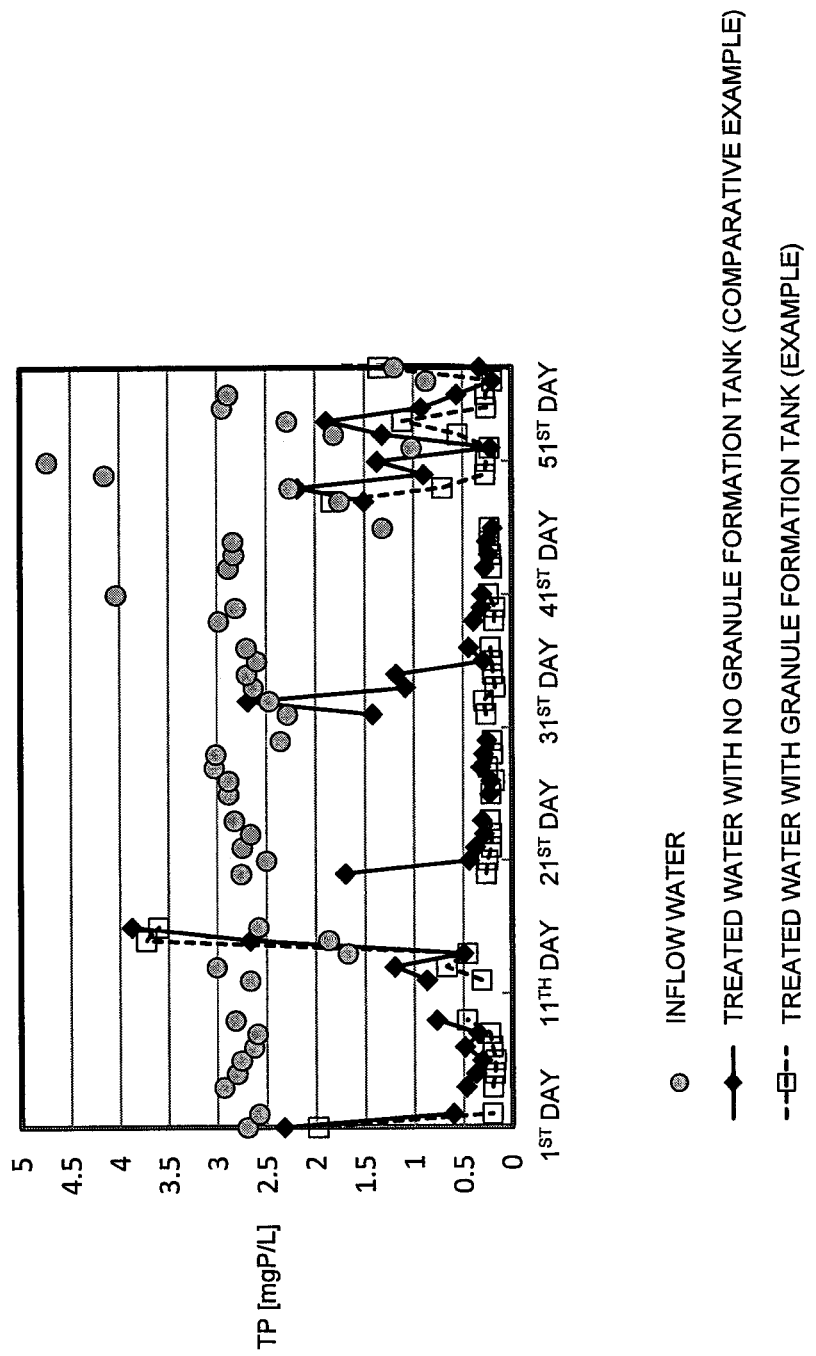
FIG. 13 is a graph illustrating the changes in the inflow water TP concentration and the treated water TP concentration during the periods when ammonia control was introduced in the continuous water flow tests of Comparative Examples 3 and 4 and Examples 2 and 4.

The changes in the inflow water TP concentration and the treated water TP concentration during the periods when ammonia control was introduced in the above continuous water flow tests (Comparative Examples 3 and 4 and Examples 2 and 4) are illustrated in FIG. 13. A deterioration in the treated water TP was observed in both systems as a result of rain, but a rapid reduction in the treated water TP was confirmed in the examples. These results also confirmed that in a continuous reaction tank to which granules have been added, by conducting blower control based on the results from an ammonia meter, stabilization of the phosphorus removal performance could also be achieved.

In this manner, by adopting the methods and devices used in the examples, treatment of a water to be treated containing organic matter and a nitrogen component was able to be introduced in a standard tank with an effective water depth of 5 m or less, and was able to suppress the energy consumption for aeration and improve the nitrogen removal rate from the water to be treated while maintaining a high MLSS value. Furthermore, in those cases where the water to be treated contains phosphorus, adopting the methods and devices used in the examples also enabled stabilization of the phosphorus removal performance.

REFERENCE SIGNS LIST 1, 2, 3, 4, 5, 6, 7: Water treatment device
10, 60, 62, 64: Biological treatment device
12: Solid-liquid separation device
14: Granule formation tank
16, 50, 52: Ammonium nitrogen concentration measurement device
18, 44: Blower
20, 46: Aeration device
22: Control device
24, 34: Water to be treated line
26: Biologically treated liquid line
28: Treated water line
30: Sludge return line
32: Sludge discharge line
36: Granule line
38, 48: Gas supply line
40, 56: Aerobic tank
42: Anaerobic tank
54: Nitrate concentration measurement device
58: Anoxic tank
66, 68: Partition wall

The invention claimed is:

1. A water treatment method for treating a water containing organic matter, phosphorus, and a nitrogen component, the method comprising:
conducting, in a biological treatment device having at least an aerobic tank, an aerobic biological treatment of an inflow water using a sludge containing granules,
performing a solid-liquid separation such that a mixed liquid of a treated water and sludge in the aerobic tank is separated into the treated water and a concentrated sludge, and
returning the concentrated sludge obtained during the solid-liquid separating to upstream of the biological treatment device,
wherein an ammonium nitrogen concentration remaining as a result of a nitrification reaction in the aerobic tank is measured by an ammonium nitrogen concentration measurement device installed in an outflow portion of the aerobic tank, and an aeration amount of an oxygen-containing gas introduced into the aerobic tank is controlled so that the measured ammonium nitrogen concentration is from 0.5 mgN/L to 5 mgN/L, so as to cause a nitrification reaction to occur on surfaces of the granules, and a denitrification reaction to proceed within an interior of the granules,
wherein the granules are formed in a granule formation tank installed outside the biological treatment device, and are supplied from the granule formation tank to the biological treatment device, and
wherein the aerobic tank is connected directly to a solid-liquid separation device, the solid-liquid separating being conducted in the solid-liquid separation device.

2. The water treatment method according to claim 1, wherein
the aeration amount of the oxygen-containing gas introduced into the aerobic tank is controlled so that the ammonium nitrogen concentration in the outflow portion of the aerobic tank falls within a range from at least 1 mgN/L to not more than 3 mgN/L.

3. The water treatment method according to claim 1, wherein
a particle size of the granules is at least 200 μm, and a sludge concentration in the aerobic tank is at least 2,000 mg/L.

4. A water treatment method for treating a water containing organic matter, phosphorus, and a nitrogen component, the method comprising:
conducting, in a biological treatment device having at least an aerobic tank, an aerobic biological treatment of an inflow water using a sludge containing granules, performing a solid-liquid separation such that a mixed liquid of a treated water and sludge in the aerobic tank is separated into the treated water and a concentrated sludge, and returning the concentrated sludge obtained during the solid-liquid separating to upstream of the biological treatment device, wherein an ammonium nitrogen concentration remaining as a result of a nitrification reaction in the aerobic tank is measured by an ammonium nitrogen concentration measurement device installed in an outflow portion of the aerobic tank, and an aeration amount of an oxygen-containing gas introduced into the aerobic tank is controlled so that the measured ammonium nitrogen concentration is from 0.5 mgN/L to 5 mgN/L, so as to cause a nitrification reaction to occur on surfaces of the granules, and a denitrification reaction to proceed within an interior of the granules, wherein the granules are formed in a granule formation tank that is provided by partitioning off a portion of the aerobic tank, and are supplied from the granule formation tank to a portion of the biological treatment device where the aerobic biological treatment is conducted, and wherein the aerobic tank is connected directly to a solid-liquid separation device, the solid-liquid separating being conducted in the solid-liquid separation device.

5. The water treatment method according to claim 1, wherein
the granule formation tank is a sequencing batch reaction tank.

6. The water treatment method according to claim 1, wherein
the ammonium nitrogen concentration remaining as a result of a nitrification reaction in the aerobic tank is measured by an ammonia measurement device installed at least in an end portion of the aerobic tank.

7. The water treatment method according to claim 6, wherein
at least one water quality measurement unit selected from among an ammonium nitrogen concentration measurement unit, a dissolved oxygen measurement unit and a nitrate concentration measurement unit is installed in a location along a lengthwise direction that is different from the installation location of the ammonia measurement device, and the aeration amount of the oxygen-containing gas introduced into the aerobic tank is controlled so that a measured value from each of the at least one water quality measurement unit falls within a prescribed range.

8. The water treatment method according to claim 1, wherein
a water depth of the biological treatment device containing the aerobic tank is 5 m or less.

9. A water treatment device for treating a water containing organic matter, phosphorus, and a nitrogen component, the water treatment device comprising:
a biological treatment device that contains at least an aerobic tank and an oxygen-containing gas supply unit for supplying an oxygen-containing gas to the aerobic tank, and is configured to conduct an aerobic biological treatment of an inflow water using a sludge containing granules,
a solid-liquid separation device that is configured to perform a solid-liquid separation of a mixed liquid of a treated water and sludge in the aerobic tank into the treated water and a concentrated sludge, a sludge return unit that returns the concentrated sludge obtained in the solid-liquid separation device to upstream of the biological treatment device,
an ammonium nitrogen concentration measurement unit that includes an ammonium nitrogen concentration measurement device installed in an outflow portion of the aerobic tank that measures an ammonium nitrogen concentration remaining as a result of a nitrification reaction in the aerobic tank, and
a control unit that is configured to control an aeration amount of the oxygen-containing gas introduced into the aerobic tank so that an ammonium nitrogen concentration measured by the ammonium nitrogen concentration measurement unit is from 0.5 mgN/L to 5 mgN/L, so as to cause a nitrification reaction to occur on surfaces of the granules, and a denitrification reaction to proceed within an interior of the granules,
wherein the aerobic tank is connected directly to the solid-liquid separation device.

10. The water treatment device according to claim 9, wherein
the control unit controls the aeration amount of the oxygen-containing gas introduced into the aerobic tank so that the ammonium nitrogen concentration in the outflow portion of the aerobic tank, measured using the ammonium nitrogen concentration measurement unit, falls within a range from at least 1 mgN/L to not more than 3 mgN/L.

11. The water treatment device according to claim 9, wherein
a particle size of the granules is at least 200 μm, and a sludge concentration in the aerobic tank is at least 2,000 mg/L.

12. The water treatment device according to claim 9, wherein
the granules are formed in a granule formation tank installed outside the biological treatment device, and are supplied from the granule formation tank to the biological treatment device.

13. The water treatment device according to claim 9, wherein
a portion of the aerobic tank is configured as a granule formation tank that is partitioned off from a portion of the biological treatment device where the aerobic biological treatment is conducted, and granules formed in the granule formation tank are supplied from the granule formation tank to the portion of the biological treatment device where the aerobic biological treatment is conducted.

14. The water treatment device according to claim 12, wherein
the granule formation tank is a sequencing batch reaction tank.

15. The water treatment device according to claim 9, wherein
the ammonium nitrogen concentration measurement unit is installed in an end portion of the aerobic tank.

16. The water treatment device according to claim 9, wherein
at least one water quality measurement unit selected from among an ammonium nitrogen concentration measurement unit, a dissolved oxygen measurement unit and a nitrate concentration measurement unit is installed in a location along a lengthwise direction different from an installation location of the ammonium nitrogen concentration measurement unit, and an aeration amount of the oxygen-containing gas introduced into the aerobic tank is controlled so that a measured value from each of the at least one water quality measurement unit falls within a prescribed range.

17. The water treatment device according to claim 9, wherein
a water depth of the biological treatment device containing the aerobic tank is 5 m or less.

* * * * *